United States Patent [19]

Fletcher et al.

[11] Patent Number: 4,722,478

[45] Date of Patent: Feb. 2, 1988

[54] ELECTRONIC WATER SPRINKLER TIMER

[75] Inventors: Douglas C. Fletcher, Peoria; Kenneth J. Bruninga, Mapleton, both of Ill.

[73] Assignee: L. R. Nelson Corporation, Peoria, Ill.

[21] Appl. No.: 838,613

[22] Filed: Mar. 11, 1986

Related U.S. Application Data

[63] Continuation-in-part of Ser. No. 575,012, Jan. 30, 1984, Pat. No. 4,592,505.

[51] Int. Cl.⁴ .............................................. A01G 27/00
[52] U.S. Cl. .................................. 239/69; 239/70; 364/144; 364/420; 137/624.18
[58] Field of Search ............... 364/141, 143, 144, 420, 364/510; 239/69, 70, 572; 137/624.2, 624.18, 119; 251/131, 316, 129.13, 129

[56] References Cited

U.S. PATENT DOCUMENTS

| | | | |
|---|---|---|---|
| 2,143,474 | 3/1940 | Brayer | 251/124.13 X |
| 3,172,604 | 3/1965 | Brock | 239/70 |
| 3,369,565 | 2/1968 | Haggard, Jr. | . |
| 3,386,620 | 6/1968 | Smith | 251/131 X |
| 3,679,134 | 7/1972 | Nixon | 239/70 |
| 3,780,766 | 12/1973 | Link | 239/69 X |
| 3,785,391 | 1/1974 | Miller | 137/119 |
| 3,865,138 | 2/1975 | Jones | 239/70 X |
| 3,921,667 | 11/1975 | Corlis et al. | 239/70 X |
| 3,921,904 | 11/1975 | Roveda | 239/70 |
| 3,924,652 | 12/1975 | Kah, Jr. | 137/119 |
| 4,023,585 | 5/1977 | Vandenburg | 239/70 X |
| 4,034,775 | 7/1977 | Slage | 137/119 |
| 4,108,419 | 8/1978 | Sturman et al. | 239/70 X |
| 4,125,124 | 2/1982 | Kah, Jr. | 137/119 |
| 4,156,437 | 5/1979 | Chivens et al. | 137/624.18 X |
| 4,165,532 | 8/1979 | Kendall et al. | 239/70 X |
| 4,189,776 | 2/1979 | Kendall | 239/70 |
| 4,282,899 | 8/1981 | Dunckhorst | 239/70 X |
| 4,316,480 | 2/1982 | Kah | 137/119 |
| 4,423,484 | 12/1983 | Hamilton | 364/420 |
| 4,592,505 | 6/1986 | Bruninga et al. | 239/69 |

FOREIGN PATENT DOCUMENTS 906454 2/1982 U.S.S.R. ............................... 239/69

Primary Examiner—Duane A. Reger
Assistant Examiner—Kevin Patrick Weldon
Attorney, Agent, or Firm—Cushman, Darby & Cushman

[57] ABSTRACT

Apparatus for connection with a sill cock for communicating water under pressure from the sill cock with a hose having a lawn sprinkler communicating therewith comprising a water control unit having a female coupler for connection with the sill cock, a male coupler for connection with the hose, a valve between the couplers and a battery operated valve mechanism operable in response to the connection of the electric current thereto for effecting movement of the valve from a closed position into an opened position, and a manually portable programming unit containing a battery operated programming keyboard, a battery operated display, and batteries operatively connected therewith. Plug and socket assemblies serve to mount the portable unit in supported relation on the first unit in an operative position and for disengagement to enable the portable unit to be disposed in a remote position with respect to the fixed first unit such that a user can operate the programming keyboard remote from the first unit allowing for observation of the display at close eye-level proximity both with respect to the selection of future sprinkling time periods and single immediate opening and closing movements of the valve.

23 Claims, 25 Drawing Figures

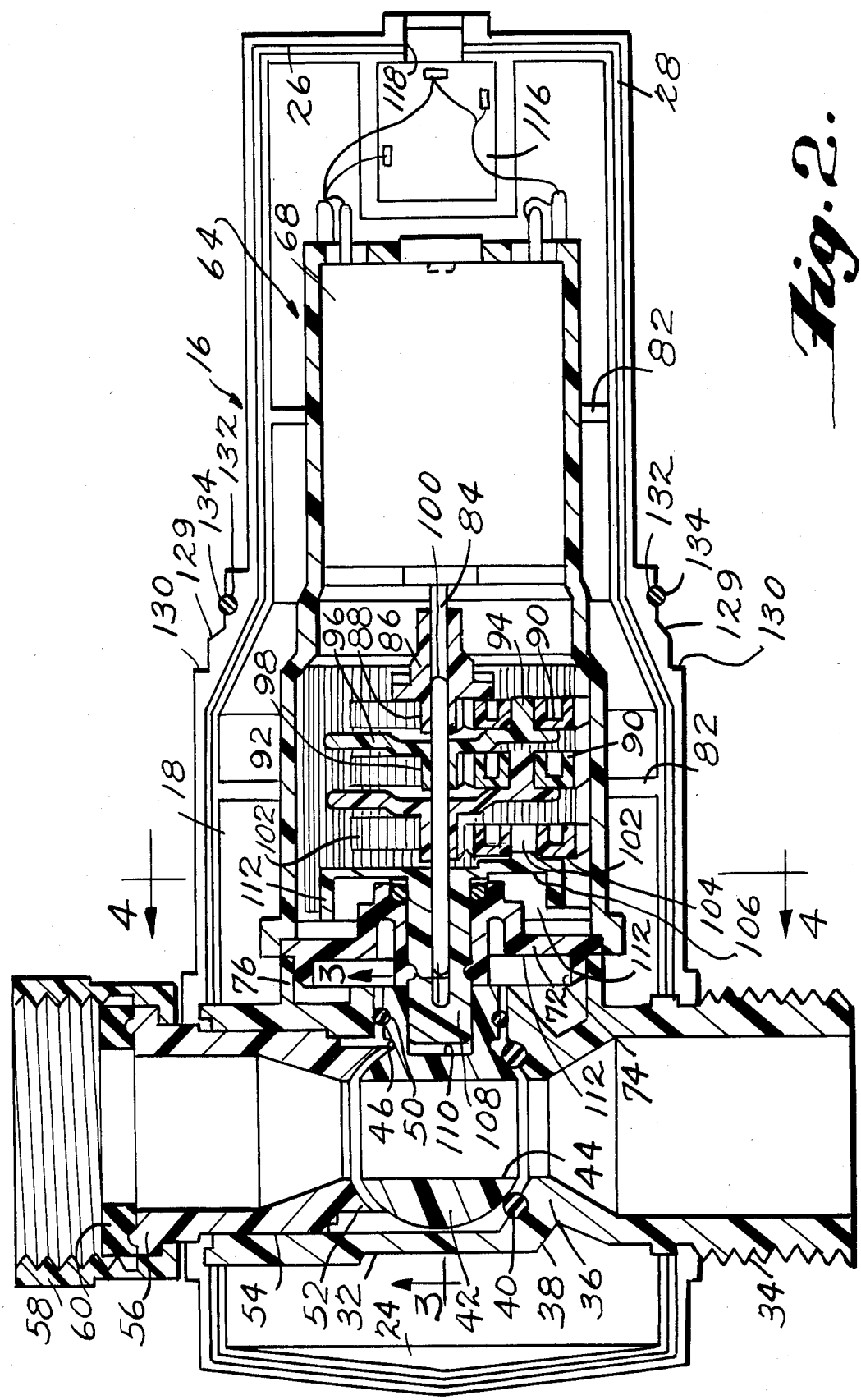

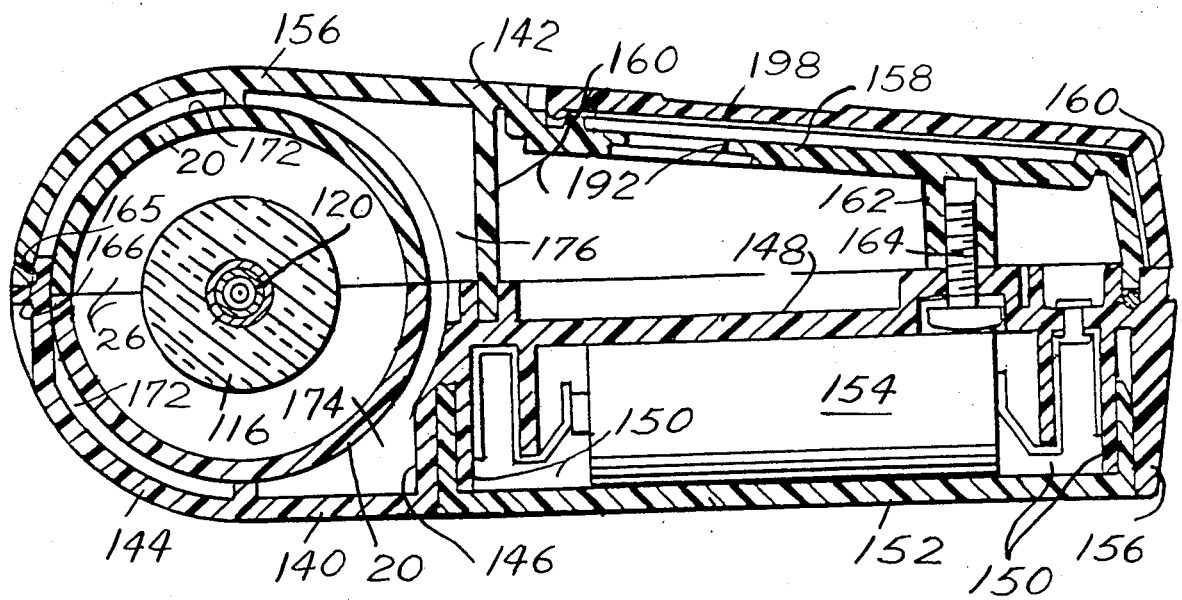
Fig. 5.
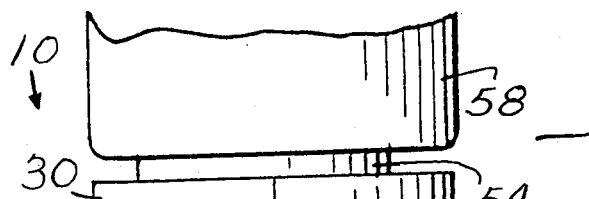
Fig. 4.
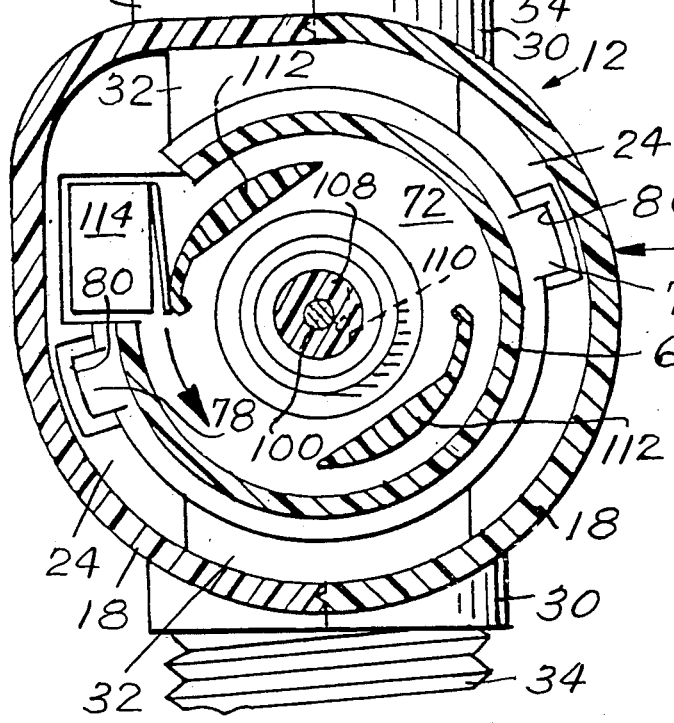
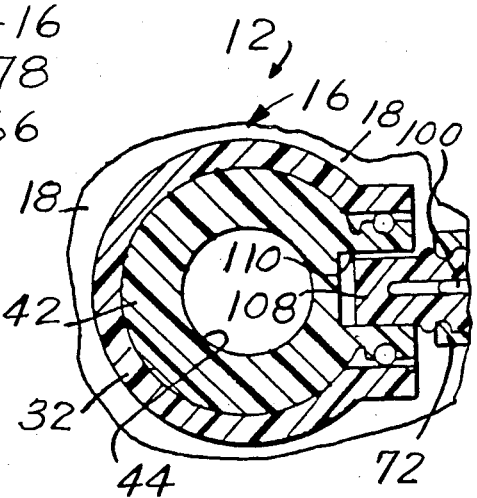
Fig. 3.

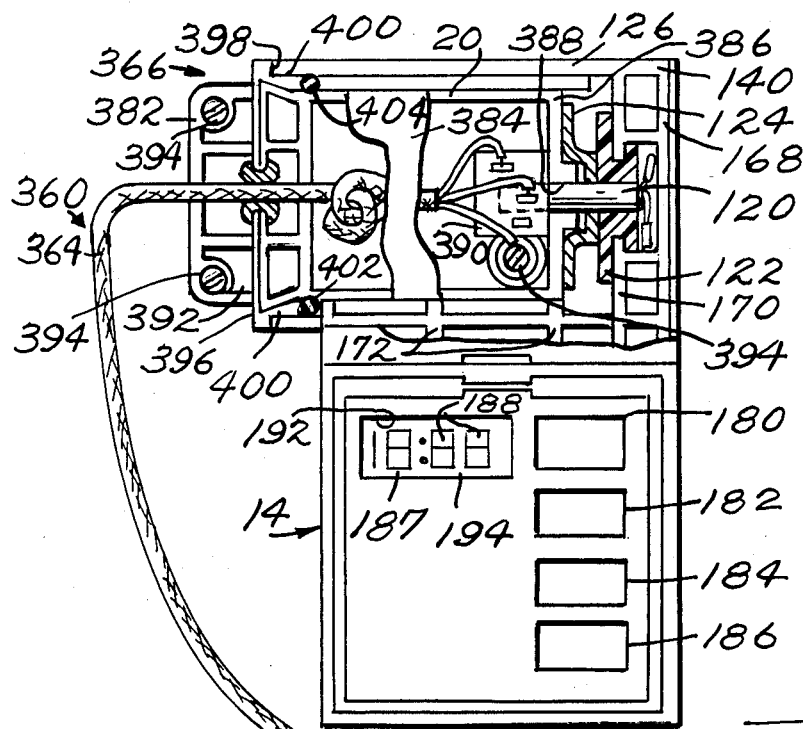
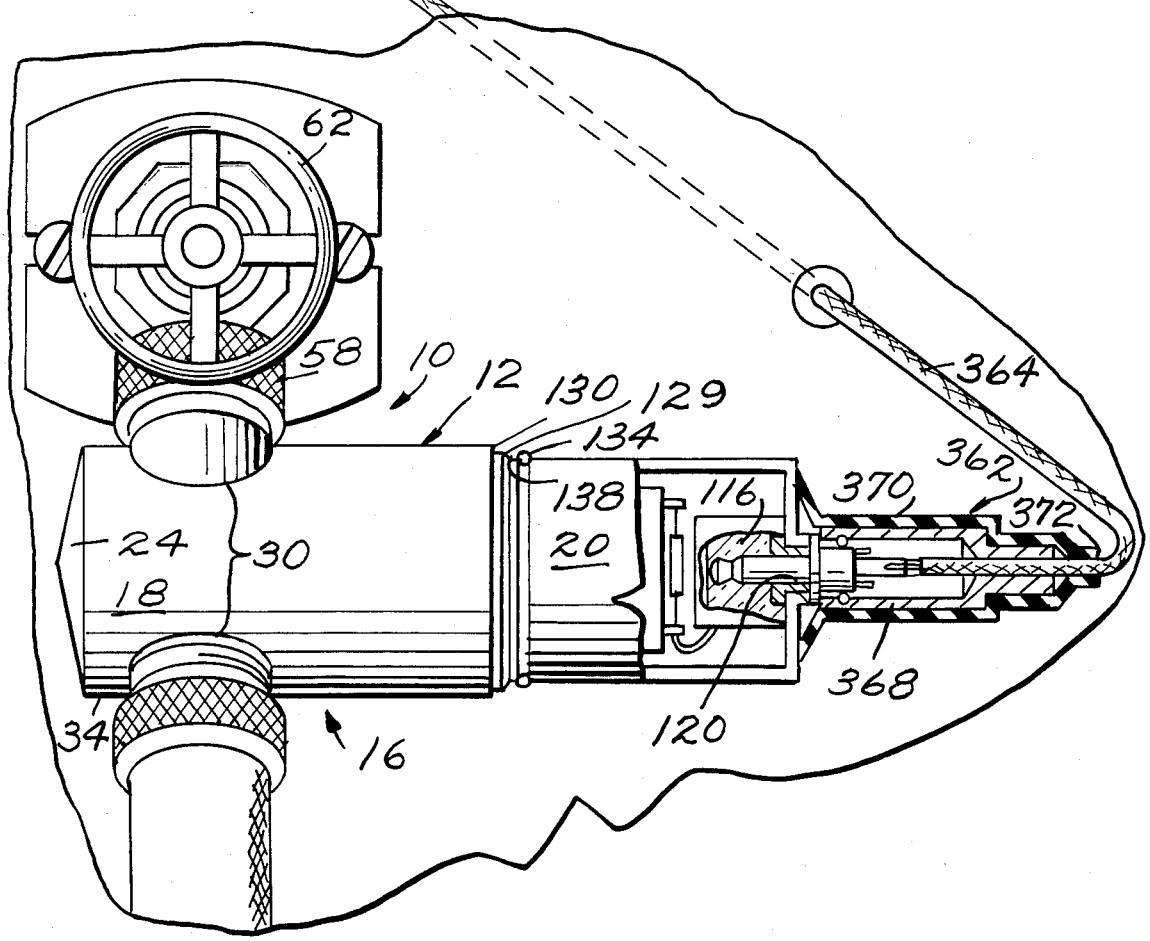
Fig. 12.

ELECTRONIC WATER SPRINKLER TIMER

This application constitutes a continuation-in-part of application Ser. No. 575,012 filed Jan. 30, 1984, which issued June 3, 1986, as U.S. Pat. No. 4,592,505.

This invention relates to sprinkling and more particularly to improvements enabling above-ground sprinklers to water automatically.

Automatic lawn watering systems have been known for many years. A typical system consists of a series of pop-up sprinkler heads which are embedded in the ground at appropriate positions throughout the lawn area to be sprinkled. Usually the heads are divided into several watering areas embodying one or more than one sprinkler head, depending upon their capacity and the capacity of the water source available. The sprinkler heads are connected in areas by an plural lawn sprinkling system embedded conduit, usually plastic pipe, and a solenoid operated valve is provided for controlling the communication of water to each zone. A fixed controller, operating usually from normal AC house current, is provided for turning off and turning on the various valves in accordance with a selected program. These plural lawn sprinkling system installed systems are effective. However, the high cost of installation severely restricts their utilization. Especially in areas where the yearly rainfall is usually sufficient to maintain lawn growth, it is hard to justify the large cost involved in the plural lawn sprinkling system components and the installation labor.

The usual alternative to an expensive plural lawn sprinkling system is to forget about sprinkling until the lawn is in danger of dying due to lack of water and then to simply connect a lawn sprinkler to one end of a hose, set it on the lawn in a position to get maximum coverage, connect the other end of the hose to the sill cock and turn on the water. All too often such sprinkling is ineffective or too late. Thus, the practical situation presented is either one of extreme automation and cost or little cost and total manual operation.

There have been various attempts to provide inexpensive sprinkling aids for use with above ground sprinklers, such as timers. The usual inexpensive timer includes a dial which is turned to a particular setting within a given time range and at the end of the time set a valve in the timer shuts off the water to the sprinkler. Thus, at best, these inexpensive timers do nothing more than save the homeowner the trouble of turning off the water after a satisfactory watering period has expired.

One of the greatest advantages of the expensive automatic plural lawn sprinkling systems is that the most desirable sprinkling time can be chosen to accomplish the actual watering which is in the pre-dawn early morning period or slightly thereafter, a time when most home owners are asleep. Inexpensive timers which merely shut off the water once it is manually turned on are no real help at all in enabling a simple hose mounted sprinkler to be turned on at a time when the home owner wants to sleep.

Expensive automatically controlled valves for turning on and turning off the flow of liquids in chemical processes and other industrial applications are known. At least one similar unit has been offered for sale for controlling a water sprinkler. This known unit is sold under the trade name "RainMatic". The RainMatic unit has a relatively large utilized housing providing a programming face or keyboard presenting sixteen keys or designated key positions. The unit is programmed by pushing the keys providing a multiplicity of times in accordance with a sequence given in a program booklet. An audible signal is sounded to indicate that an intended push has been effectively entered. There is no way of checking what program has been entered once it is entered. Finally, the unit is much more expensive than typical inexpensive commercially available timers. There still exists a need for a simpler, substantially less expensive device which will not only turn off the water after a predetermined watering time has been completed, like the known inexpensive timers, but will turn it on, as well, at any desired preset time, such as in the early morning hours, like the more expensive and complex known unit discussed above. Furthermore, this device should be easily and conveniently programmable.

It is an object of the present invention to fulfill the needs discussed above. In accordance with the principles of the present invention this objective is obtained by providing an apparatus for connection with a sill cock for communicating water under pressure from the sill cock with a hose having a lawn sprinkler communicating therewith which comprises a female coupler for connection with the sill cock, a male coupler for connection with the hose and a valve between the couplers movable into opened and closed positions with respect thereto so as to permit and prevent respectively communication of the water under pressure from the sill cock when the female coupler is connected therewith with the hose when the male coupler is connected therewith. The apparatus further includes one or more batteries for providing a source of electrical current, a valve moving mechanism operable in response to the connection of the electric current from the battery therewith for effecting movement of the valve from its closed position into its opened position, a battery operated programming keyboard for selecting a sprinkling time in the future when it is desired to water with the sprinkler, a battery operated display for displaying the sprinkling time selected by the programming keyboard and an electrical connection operable when the sprinkling time selected arrives for connecting an electrical current from the battery with the valve moving mechanism.

An important aspect of the present invention is that the components mentioned above are mounted in a plurality of separate housing units including a first housing unit containing the male coupler, the valve, and the female coupler so as to render the first housing unit operable to be fixed to the sill cock in supported relation thereby when the female coupler is connected therewith. The plurality of housing units also includes a manually portable housing unit containing the battery operated programming keyboard, the battery operated display and the battery operatively connected therewith such that a user can operate said programming means remote from said first housing unit allowing for observation of the display at close eye level proximity.

Although the housing units including the microcontroller and the valve are separable units, nevertheless special circuitry is provided to ensure that full control of the valve assembly can be effected when the valve assembly and the control assembly are separate. Thus, for example, the controller can be removed from the valve assembly and a manual on command input to the controller assembly. The special circuitry and structure included in the present invention ensures that when the controller and the valve assembly are again docked in supported relation, the previously executed instruction is effected.

Thus in summary, any command which the valve unit is capable of effecting can be entered in the controller unit when the valve unit and the controller unit are separated. This allows much greater user flexibility, as often a sill cock will be located in a very low or otherwise inaccessible location. In this case, using the devices taught by the prior art, the user would be required to contort himself in order to effectively turn on or off the device.

In contrast, the device taught by the present invention allows the user to remove the controller unit and take it to a remote location where programming and/or control is extremely facilitated. When the controlling unit is again docked with the valve unit, any commands entered will be effected.

Thus, at this convenient close eye level proximity the user cannot only select and enter the desired sprinkling time period, but can also operate the keyboard to accomplish an immediate single valve movement, either a valve movement from its closed position into its opened position or a valve movement from its opened position into its closed position. In accordance with the principles of the present invention, this function can be accomplished either (A) in response to the mounting of the programmable unit on the fixed unit when a single valve movement has been selected on the programming unit with the programming unit disengaged from the fixed unit or (B) when a single valve movement is selected on the programming keyboard with the programming unit supported on the fixed unit.

Preferably, the valve is a ball valve and the valve moving mechanism is a DC motor driving a planetary gear reduction unit connected to turn the ball valve in one direction until stopped after each quarter revolution by a cam actuated switch, all of which form a part of the fixed housing unit. Electrical socket and plug assemblies serve to electrically connect the output signal of the portable programming unit with the DC motor and switch circuit of the fixed unit when the two units are interconnected. A further advantage of providing separate units of this type is that by providing an extension cord accessory with compatible plug and socket assemblies the programming unit can be supported at a remote location, as, for example, on an inside garage or kitchen wall or the like, for both inside programming and operation of the remote outside fixed unit. On an inside wall the display of the programming unit serves as a clock.

A still further advantage of providing separate units is that it becomes possible to offer not only a simple inexpensive one shot programming unit, but an alternative more elaborate programming unit, as, for example, a unit having the capability of programming a plurality of separate watering times (e.g. three) in any one day and of programming their day-to-day frequency.

In accordance with the principles of the present invention a programming unit of the more elaborate type has the greater advantage of forming a component of an above-ground watering system for the entire lawn rather than just the area covered by a single sprinkler. In accordance with the principles of the present invention, the system merely requires the utilization of plural sprinklers and hoses sufficient to connect the sprinklers to the plural outlets of a portable stepping valve unit providing a support enabling it to be displayed on the lawn in a position such that its single inlet can be connected by a hose to the outlet of the valve unit fixed on the sill cock. The portable stepping valve unit of the system operates in response to each water turn-on/water turn-off cycle to communicate the water turned on progressively to each of the plural outlets provided. In this way, each separate watering period programmed will be applied to a separate sprinkler supported on a separate area of the lawn, thus enabling the entire lawn to be watered automatically at the most desirable time—which is while the homeowner is fast asleep.

Accordingly, it is a further object of the present invention to provide a system of the type described embodying a plural watering period programming unit, a cooperable sill cock mounted fixed unit, a stepping valve unit, a plurality of sprinklers all of which are appropriately hose-connected, which system is effective in operation and economical to manufacture.

These and other objects of the present invention will become more apparent during the course of the following detailed description and appended claims.

The invention may best be understood with reference to the accompanying drawings, wherein an illustrative embodiment is shown.

IN THE DRAWINGS

FIG. 2 is an enlarged vertical sectional view of the sill cock mounted water control unit;

FIG. 3 is a fragmentary cross-sectional view taken along line 3—3 of FIG. 2;

FIG. 4 is a cross-sectional view taken along the line 4—4 of FIG. 2;

FIG. 5 is a cross-sectional view taken along the line 5—5 of FIG. 1;

Figure 1:
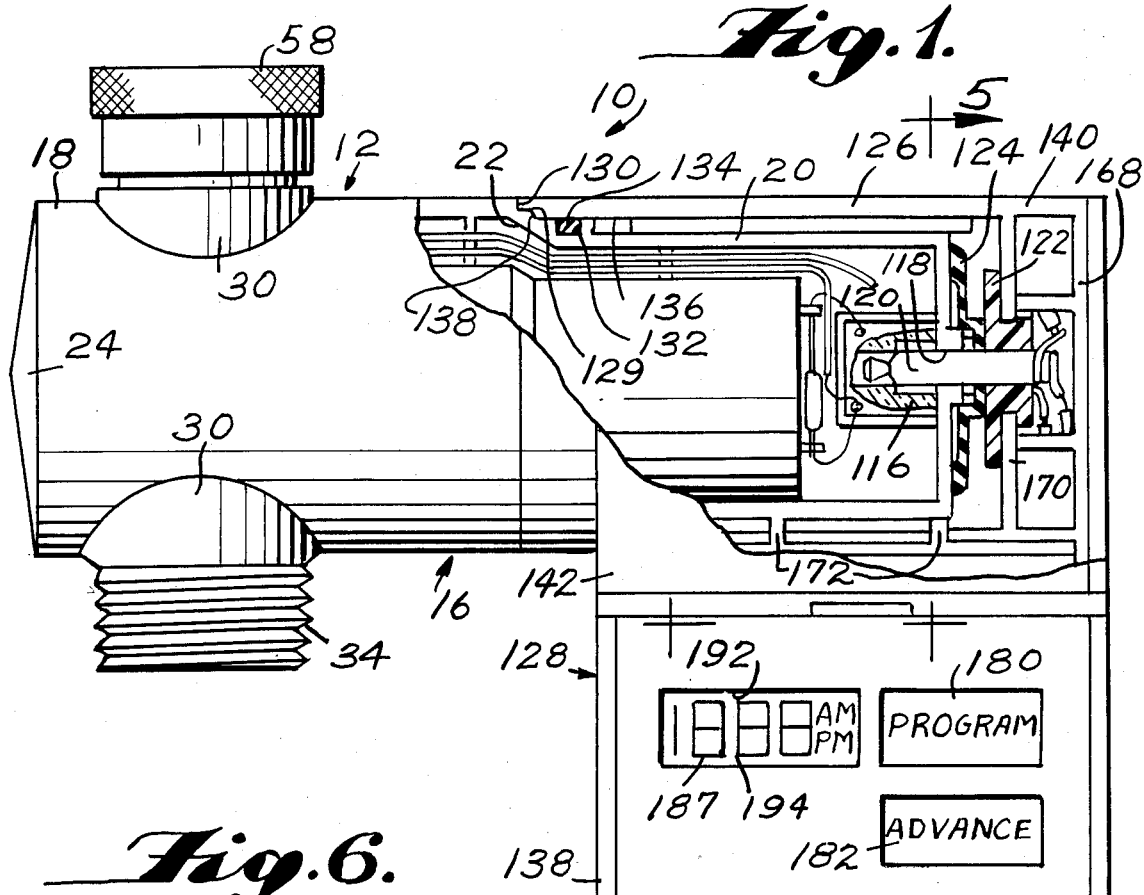
FIG. 1 is a front elevational view of one form of apparatus embodying the principles of the present invention showing the programming unit partly in section and with the cover removed.
Figure 7:
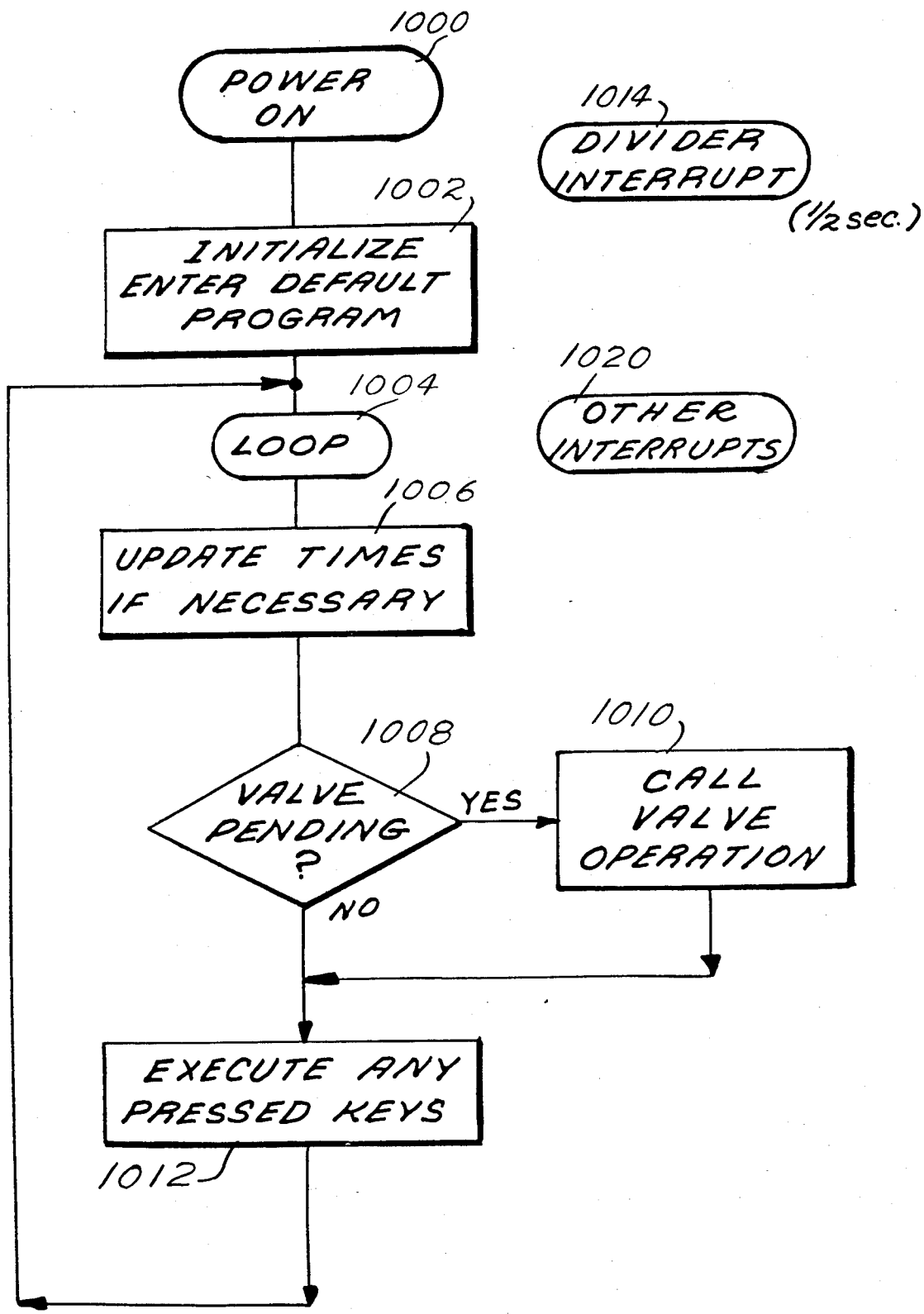
Figure 10A:
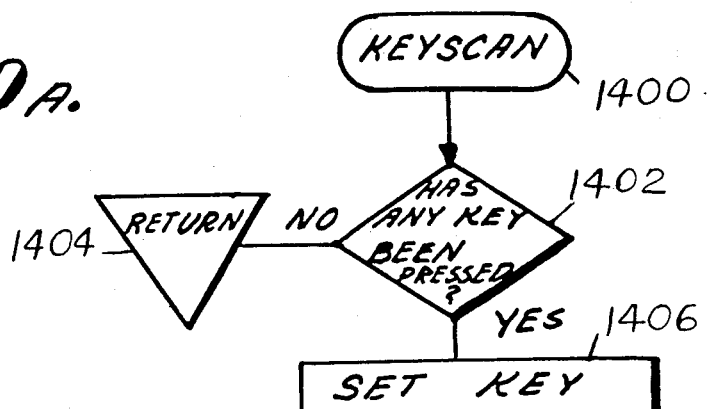
Figure 10B:
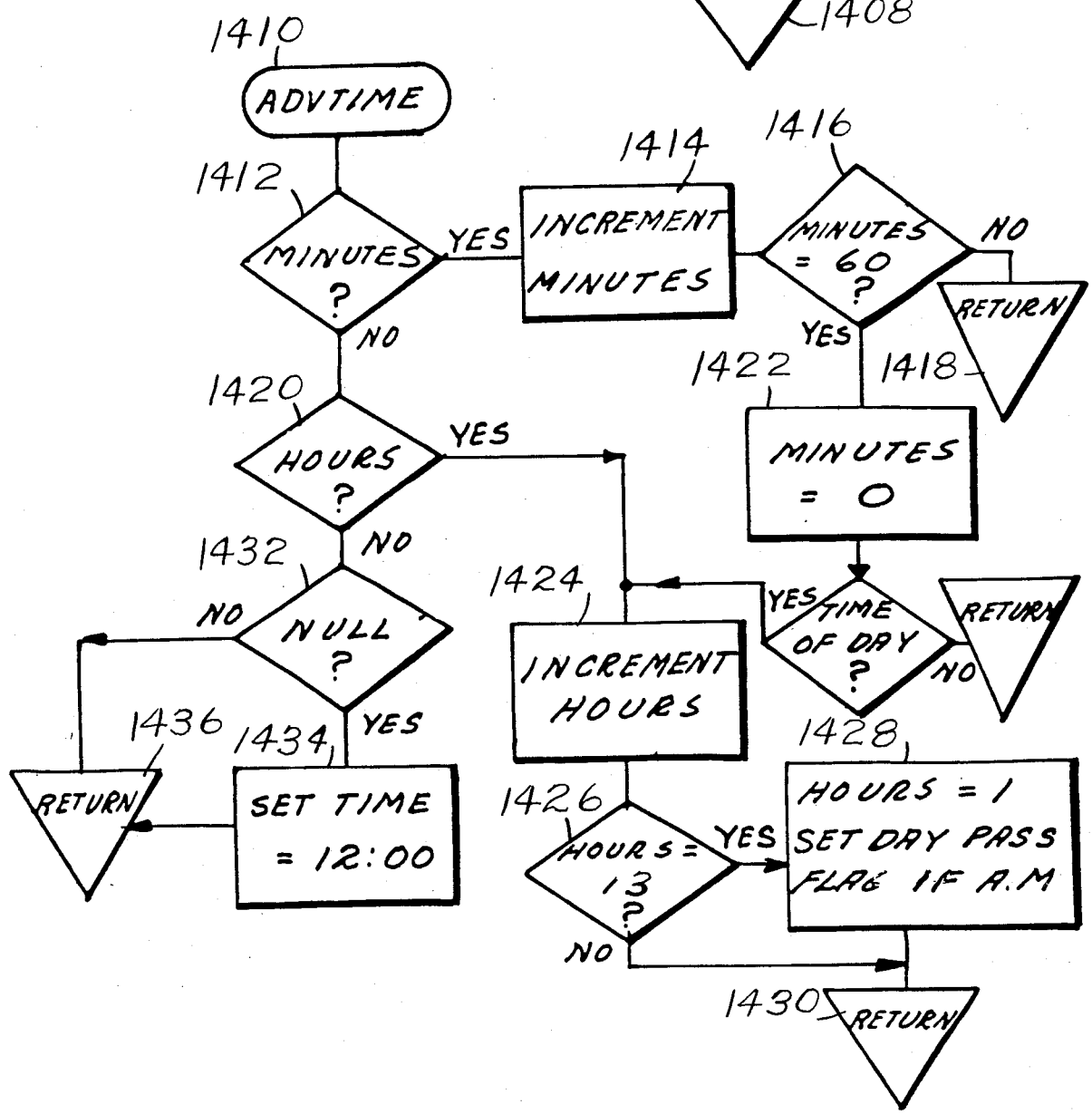
Figure 11:
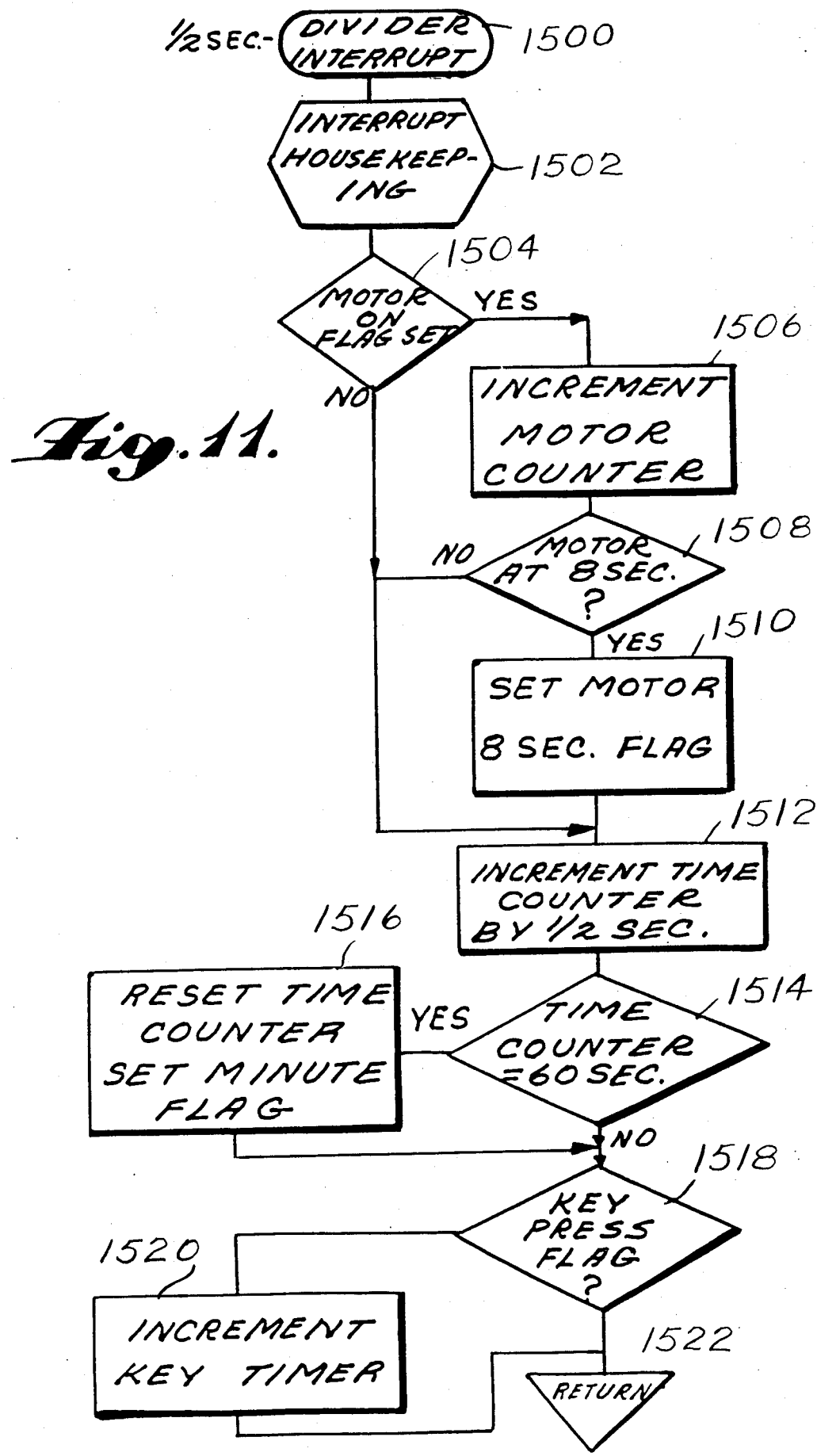
Figure 13:
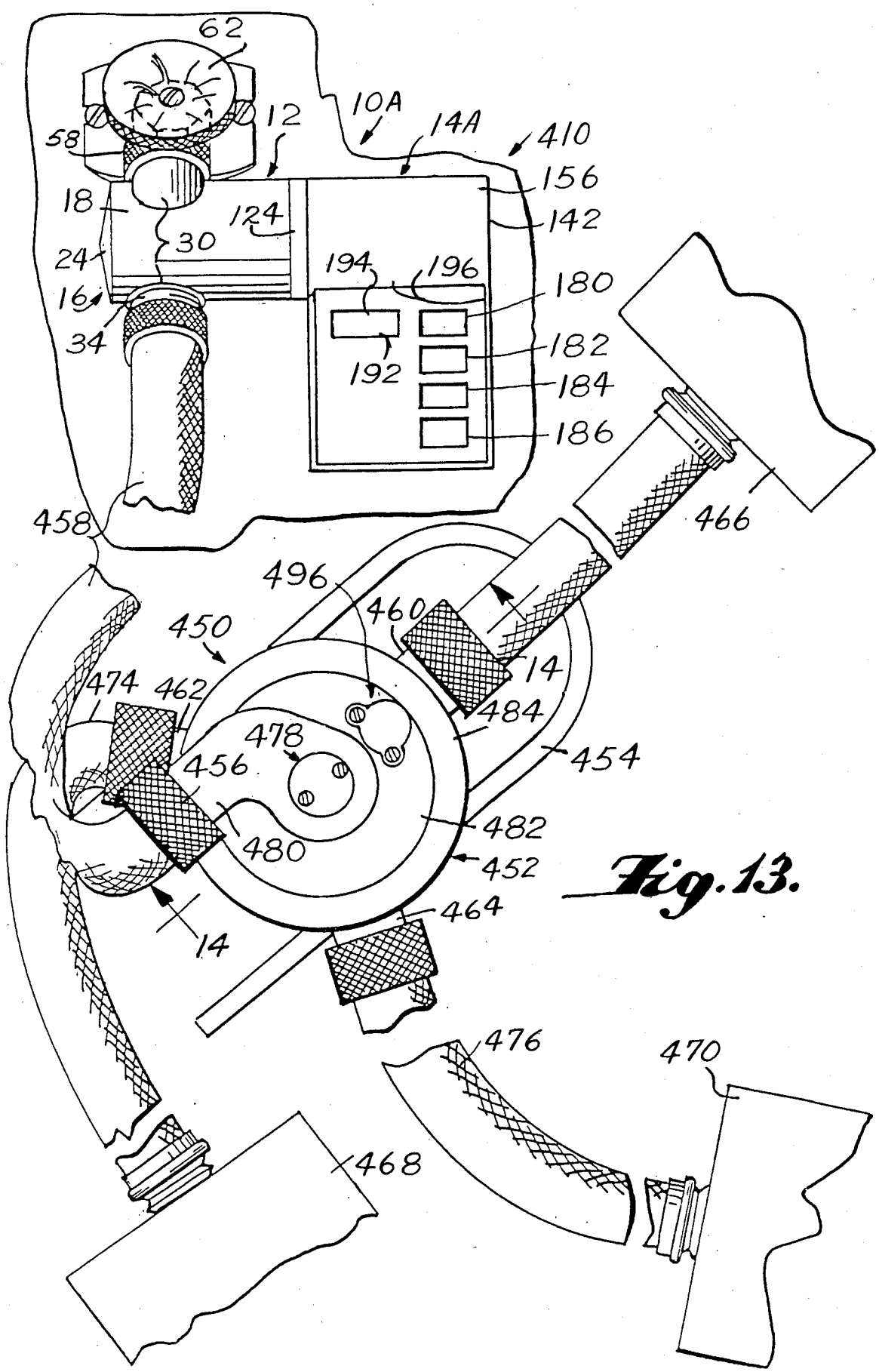
Figure 14:
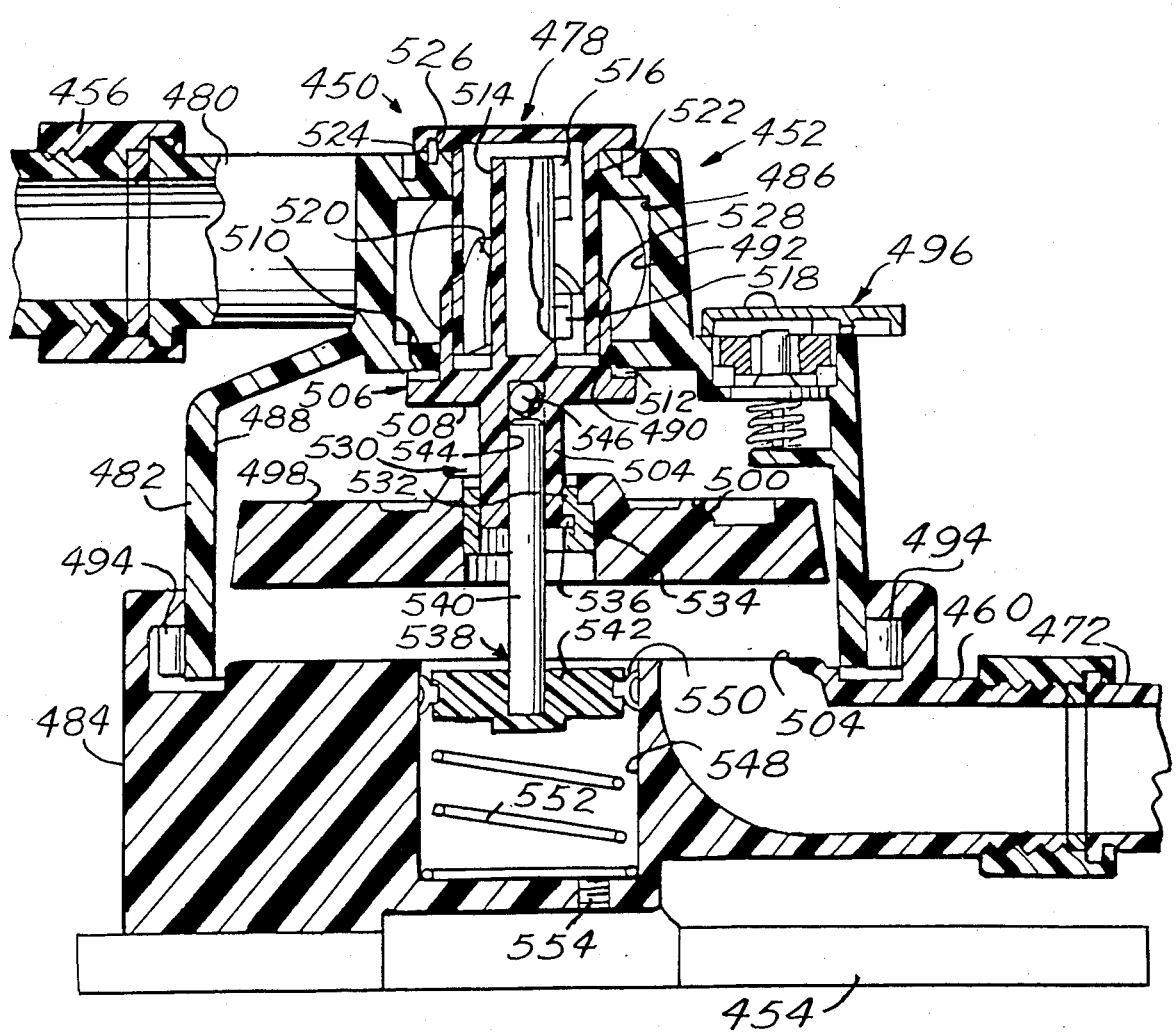

FIGS. 7 and 8A-I represent a flow diagram of the main program for the microcontroller of the programming unit shown in FIGS. 1-5;

FIGS. 9 through 11 represent a flow diagram of the key execution sub-routines for the program of FIGS. 7 and 8;

FIG. 12 is a view similar to FIG. 1 showing an extension cord accessory connected between the sill cock mounted water control unit and the programming unit;

FIG. 13 is a diagrammatic top plan view of a complete above-ground lawn watering system embodying the principles of the present invention including a programming unit of a more elaborate capability; and FIG. 14 is an enlarged cross-sectional view 30 taken along the line 17—17 of FIG. 13 showing the stepping value unit of the system.

Referring now more particularly to FIG. 1 of the drawings, there is shown therein an apparatus, generally indicated at 10, for connection with a sill cock for communicating water under pressure from the sill cock with a hose having a lawn sprinkler communicating therewith. The apparatus 10, as shown, includes a sill cock mounted water control unit, generally indicated at 12, adapted to be fixed in supported relation with a conventional sill cock commonly found in dwellings and in other buildings as well. Detachably connected in supported relation with the water control unit 12 is a portable programming unit, generally indicated at 14.

As best shown in FIG. 2, the water control unit 12 includes an exterior housing assembly, generally indicated at 12, which is formed essentially of two complementary hollow half sections each including a large diameter generally semi-cylindrical peripheral wall portion 18, a small diameter semi-cylindrical peripheral wall portion 20 and a semi-frustoconical transition wall portion 22 between the wall portions 18 and 20. A semicircular end wall 24 is formed on the open end of each large semi-cylindrical wall portion 18. Similarly, the free end of each small diameter wall portion 20 is closed by a semi-circular end wall 26. As shown, the peripheral wall portions and end walls of each section are formed with free edges disposed in a common plane so as to be capable of being moved into abutting relation to one another. As shown in FIG. 2, the edge of one of the housing sections is formed with a bead 28 which materially aids in fixedly assembling the two half sections together, as by heat welding, such as sonic welding or the like.

Formed in the large peripheral wall portion 18 of each half section is a pair of oppositely extending semi-cylindrical boss portions 30 each of which defines a semi-cylindrical opening which is formed in and interrupts the adjacent edge configuration. Mounted within the interior of the bosses 30 in fixed relation is a tubular valve housing member or casing 32. One end of the valve casing 32 extends outwardly through one pair of associated boss portions 30 and is formed into a conventional male hose coupler 34. The central interior of the valve casing 32 has an interior annular flange formed therein providing an annular groove 38 within which is seated an O-ring seal 40 adapted to engage one exterior end portion of a ball valve 42 mounted within the central portion of the casing 32 for rotational movement about an axis intersecting the axis of the tubular casing 32 at right angles thereto. The ball valve 42 includes a generally spherical periphery having an opening 44 extending therethrough. At a position extending at right angles from the axis of the opening 44, the ball valve 42 has an integral exterior stem portion 46 which is rotatably mounted within an opening 48 formed in the wall of the tubular casing 32. Preferably, an O-ring seal 50 is mounted within a suitable exterior peripheral groove 50 in the valve stem 46 which O-ring seal engages the interior surfaces defining the opening 48. When the ball valve 42 is disposed in a position in which the axis of the opening 44 is aligned with the axis of the tubular casing 32, the ball valve is in an open position and the O-ring seal 40 serves to seal the outlet end of the opening 44. The inlet end of the opening 44 is supported by radially spaced segments 52 formed on the inner end of a tubular housing member 54 which is mounted with and is suitably fixed, as by welding or the like, to the tubular casing 32. The housing member 54 extends outwardly through the other pair of associated boss portions 30 and has an annular flange 56 extending radially outwardly from the free end thereof. Flange 56 serves to rotatably support a conventional female hose coupler 58 having a washer 60 mounted therein in accordance with conventional practice.

FIG. 12 illustrates a sill cock 62 of conventional construction, it being understood that the outlet of the sill cock is formed into a conventional male hose coupler (not shown) adapted to cooperate with the female hose coupler 58. When so connected, the female coupler 58 serves to fix the entire unit 12 to the sill cock in supporting relation. The female coupler 58 forms an inlet for receiving water under pressure from the sill cock and the male hose coupler 34 constitutes an outlet for the water under pressure which is controlled by virtue of the position of the ball valve 42.

Supported within the central portion of the housing assembly 16 is a valve moving mechanism, generally indicated at 64. The mechanism 64 comprises in general a tubular housing member or casing structure 66 within one end of which is mounted a direct current electric motor 68 of conventional construction. Mounted within the casing structure 66 between the electric motor 68 and the valve 42 is a gear reduction assembly, generally indicated at 70, which preferably is of the planetary type. The casing structure 66 is of stepped cylindrical configuration and is arranged so that its small end fixedly receives the electric motor 68 and its large end is open to receive the planetary gear assembly 70. As best shown in FIG. 2, the large open end is closed by an end closure 72. End closure 72 includes a forwardly projecting annular mounting flange 74 which is adapted to fit in keyed relation within a receiving annular flange 76 formed as an integral part of the casing 32 in surrounding coaxial relation with respect to the opening 48. As best shown in FIG. 4, the casing structure 66 is formed with a pair of diametrically spaced forwardly extending hooked arms 78 which are adapted to lockingly snap into sockets 80 formed in corresponding portions of the casing 32. The engagement of the hooked structure 66 and end closure 72 in fixed operative relation with respect to the casing 32. To further aid in supporting the casing structure 66 within the housing assembly 16, each housing section is formed with a pair of semi-annular support ribs 82 which supports the casing structure 66 in accurately centered relation within the housing assembly.

As best shown in FIG. 2, the motor 68 includes an output shaft 84 which is suitably connected with a sun gear element 86 forming a part of the planetary gear reduction unit 70. Sun gear element 86 includes exterior spur gear teeth 88 which mesh with a plurality of planet spur gears 90. The outer periphery of the planet spur gears 90 mesh with interior orbit gear teeth 92 formed integrally on the associated interior portion of the casing structure 66. Planet gears 90 are rotatably supported on shafts 94 fixed to a carrier 96. Carrier 96 has formed integrally thereon a sun gear 98 which is rotatably mounted on a shaft 100, one end of which is rotatably carried within sun gear element 86 fixed to the end of the motor output shaft 84.

Carrier 96 with the associated shafts 94 and planet gears 90 associated with sun gear 98 constitutes one full stage of the planetary gear unit 70. As shown, there are two such full stages which simply repeat these parts. The sun gear 98 of the other planetary gear stage meshes with a series of planet gears 102 which are carried by shafts 104 fixed to a carrier 106. Carrier 106 has formed thereon, in lieu of the sun gear elements 98 previously described, a stub shaft section 108 which is interiorly bored to rotatably support the opposite end of the carrier and sun gear support shaft 100. As shown in FIG. 4, the exterior cross-sectional configuration of the shaft 108 is non-circular, as, for example, D-shaped so as to engage within a similarly shaped opening 110 formed in the valve stem 46.

As best shown in FIG. 4, the carrier 106 also includes a pair of diametrically opposed forwardly extending cam elements 112 which are adapted to cooperate with a switch 114 suitably mounted between the end closure 72 and the casing structure 66. Each cam element 112 has an angular extent of approximately 90° and is related to the position of the switch 114 such that the switch will be moved from one of its positions to the other when the ball valve 42 is moved into one or the other of its positions. An exemplary arrangement is one in which the switch is a normally opened switch which is moved into its closed position when the valve 42 is moved into its opened position. Conversely, when the valve 42 is moved into its closed position, the switch 114 is moved from its closed position into its opened position. The arrangement is such that the switch and valve have a 4-step cycle for each revolution of the valve. Beginning with the switch in its opened position and the valve in its closed position, the first step is for the valve to move 90° from its closed position into its opened position. The switch remains open until the end of the 90° valve movement at which time it is moved into its closed position. The second step is for the valve to move another 90° from its opened position into its closed position. During this 90° movement, the switch 114 remains in its closed position until the end of the movement at which time it moves into its opened position. Steps 3 and 4 are similar to steps 1 and 2 respectively. It will be understood that the transitions of the switch from opened to closed and closed to opened are utilized as signals in the control electronics hereinafter to be more fully described.

The switch 114 is electrically connected, together with the d.c. motor contacts, to the contacts of a 3-lead socket assembly 116 mounted in the end wall of the housing assembly 16, which is formed with a central opening 118 defining a plug receiving opening. The 3-lead socket assembly 116 is of conventional construction and is adapted to detachably receive a cooperating 3-lead plug assembly 120. As best shown in FIG. 1, the plug assembly 120 is carried in forwardly extending relation to a double flanged fitting 122 having a forwardly flared resilient suction cup element 124 fixed forwardly thereof in concentric relation with the plug assembly 120. The fitting 122 is, in turn, carried within a tubular section 126 of a housing assembly, generally indicated at 128. The tubular section 126 provides an interior periphery which is of a size and shape to supportingly fit over the cylindrical exterior periphery of the small diameter wall portions 20 of the housing assembly 16.

As best shown in FIGS. 1 and 2, each of the housing sections of the assembly 16 has formed on the transition wall portion 22 thereof a frustonical surface 129 spaced from a semi-annular abutment surface 130. Spaced from each surface 129 in an opposite direction from the associated abutment surface 130 is a semi-annular groove 132. When the half sections of the housing assembly 16 are secured together, the annular groove formed by the semi-annular grooves 132 has an O-ring 134 mounted therein. The O-ring 134 is adapted to frictionally engage an interior cylindrical surface 136 formed on the opposite open end portion of the tubular housing section 126 in inwardly spaced relation from the free edge thereof. At a position spaced between the cylindrical surface 136 and the free edge is a frustoconical surface 138 which mates with the surfaces 129. In this way, the housing assembly 128 is frictionally retained in supported relation on the exterior of the housing assembly 16 for rotational movement about the commom axis of the exterior cylindrical periphery of the housing assembly 16 and the interior periphery of the tubular housing section 126 of the assembly 128. The socket and plug assemblies 116 and 120 accommodate this movement while retaining the electrical contact between the three leads of each assembly. The frictional engagement of the O-ring 134 with the cylindrical surface 136 serves to frictionally retain the housing assembly 128 in any rotational position.

The housing assembly 128, in addition to the section 126, also includes a keyboard circuit board and battery carrying section 138. Both sections 126 and 138 of the assembly are defined by a pair of cooperating housing half parts 140 and 142. As best shown in FIG. 5, the housing part 140 includes a partially curved bottom wall 144 having an intermediate vertical wall 146 extending upwardly from the flat end thereof. A battery compartment wall 148 extends horizontally from the upper end of the vertical wall 146. The battery compartment is defined vertically by four peripheral walls 150 extending downwardly from the wall 148 and is closed by a removable flanged bottom wall 152. Batteries 154 are supported within the battery compartment so as to be connected electrically in accordance with conventional practice. The part 140 also includes outer side and end walls 156 extending downwardly from the side and end edges of the wall 148.

The housing part 142 includes a curved top wall 156 complementary to the curved bottom wall 144 and a recessed keyboard supporting wall 158 extending therefrom. The keyboard supporting wall 158 has side and end walls 160 extending downwardly therefrom which define an electronic component compartment. The keyboard supporting wall 158 also has a tubular boss 162 extending downwardly therefrom. Boss 162 receives a bolt 164 which extends through an appropriate bossed opening in the battery compartment wall 148 so as to fixedly secure the two housing half parts 140 and 142 together.

The curved top and bottom walls 156 and 144 define with the upper surface of vertical wall 146 the exterior of the tubular section 126 of the housing assembly 128. As best shown in FIG. 5, the central upper end of the curved portion of the bottom wall 144 is flattened and extended upwardly and formed with an outwardly facing groove 165 for receiving an inwardly projecting ridge 166 on the lower interior of the adjacent portion of the curved top wall 156. By interengaging the ridge 166 within the groove 165, the two parts 140 and 142 can be initially connected together and then pivoted together so as to enable a single bolt 164 to accomplish effective securement of the parts together.

As best shown in FIG. 1, one end of the tubular section 126 of the housing assembly 128 is closed as by end walls 168 formed on the parts 140 and 142. Formed inwardly of the end walls are a pair of cooperating arcuate walls 170 which are adapted to enter between the double flanges of the fitting 122 to hold the same in place. In addition, a longitudinally spaced plurality of pairs of arcuate spacer ribs 172 are provided to guide on the cylindrical surface 66 of the housing assembly 164 when the unit 14 is in its supported relation on the unit 12.

The keyboard supporting wall 158 supports a laminated keyboard assembly, generally indicated at 178, which includes 4 keys designated as follows, a program key 180, an advance key 182, an on key 184, and an off key 186. In addition, the keyboard supporting wall 158 is formed with a rectangular opening 192 within which is mounted a display 194. The display 194 preferably is a liquid crystal display of known construction suitable to display the time of day. Along each side of the keyboard wall 158 there is formed a pair of undercut rails 196 which serve to slidably receive a removable cover 198 for the keys and display 194.

In the operation of the apparatus 10, female hose coupler 58 of the water control unit 12 is threadably engaged on the male hose coupler of the sill cock 62. The housing assembly 16 of the unit 12 is, in this way, fixed in supported relation on the sill cock. The male hose coupler 34 can then be connected to the female hose coupler of a hose the opposite end of which is connected with a sprinkler.

The portable programming unit 14 is completely removable from the unit 12 and of a size to enable the user to conveniently hold it while viewing the keys and display at an appropriate eye proximity. To program the unit 14, a user first presses the program key 180. The effect of the initial pressing of this key is that hour digit 187 will flash indicating that the hours of the time of day are in programming mode. In order to advance the hours, the user need only press advance key 182. By pressing advance key 182, the time of day will advance by one hour in this mode.

Similarly, depressing program key 180 a second time will cause time of day minutes 188 to enter flashing mode. In this flashing mode, pressing advance key 182 will cause the minutes to increment.

By repeatedly pressing the program key, other possible programming options are serially cycled through. Therefore, in a multiplex type fashion, all functions of the portable programming unit can be conveniently programmed using only four keys.

Pressing the program key a third time leaves the user in the day of the week programming mode which is also advanced by pressing advance key 182. Pressing program key 180 a fourth time, however, leads to watering day mode. In watering day mode, the user can program which particular days of the week are desired to be used as turn on days. A user can program the unit to turn on any or all of the days Sunday through Saturday. To program days of the week desired for water turn on, the user advances the day of the week blinking to the desired day and presses either on button 184 to make the flashing indication an on watering day, or off button 186 to turn the day off as a watering day. To advance between the different days of the week, advance button 182 is used.

Also, the user can, rather than programming individual days, program every other day (or second option) or every third day (or third option). If either the second option or the third option is selected by the user, the previously stored days of the week are automatically purged.

By again depressing programming button 180, the start and run times programming mode is entered. In the best mode of the present invention, three start times representing three different times of day that the device can be turned on to allow water to flow can be programmed. For each start time is associated a run time, which is the length of time that the water, once turned on by the valve, will remain on. The first depression of program button 180 allows start time 1 to be programmed. First, the hours of the start time are programmed. By pressing program button 180 a further time, the minutes of the start time can be programmed. Then, another depression of program button 180, will allow run time 1 to be entered and updated. Similarly, start and run times 2 and 3 are operated in the same way.

Also, the operator can depress on button 184 which is a manual on means to effect a manual turn-on of the hose connected to valve assembly 12. By a single depression of on button 184, the valve will enter a manual watering cycle, having a default run time set at 30 minutes. This run time will be displayed on the display, and will be decremented so that the user can manually perceive the amount of time remaining for the water on cycle. By depressing the programming button 180 and advance button 182, this remaining amount of time can be altered to any desired amount up to 11 hours 59 minutes.

Furthermore, the valve of the device can be turned off by merely depressing off button 186, the manual off means. If the valve has been turned on by means of on button 184, depression of button 186 will merely terminate the sequence and cause the valve to again close. Also, if the device has been programmed to go on at a certain predetermined time, the user can terminate the particular sequence by merely pressing the off button. This manual operation will not affect any further programming operations of the device, but will merely terminate the sequence being executed.

Also, the portable programming unit 14 and valve assembly 12 can be disengaged into two separate units at any time for user convenience. Any pending commands, such as manual commands made by the user during the period of disengagement, or commands caused by a run time being encountered during the time of disengagement, will be automatically executed upon docking of the portable programming unit and the valve assembly 12. A delay of 1.7 seconds after docking is built into the system to ensure proper docking.

Figure 6:
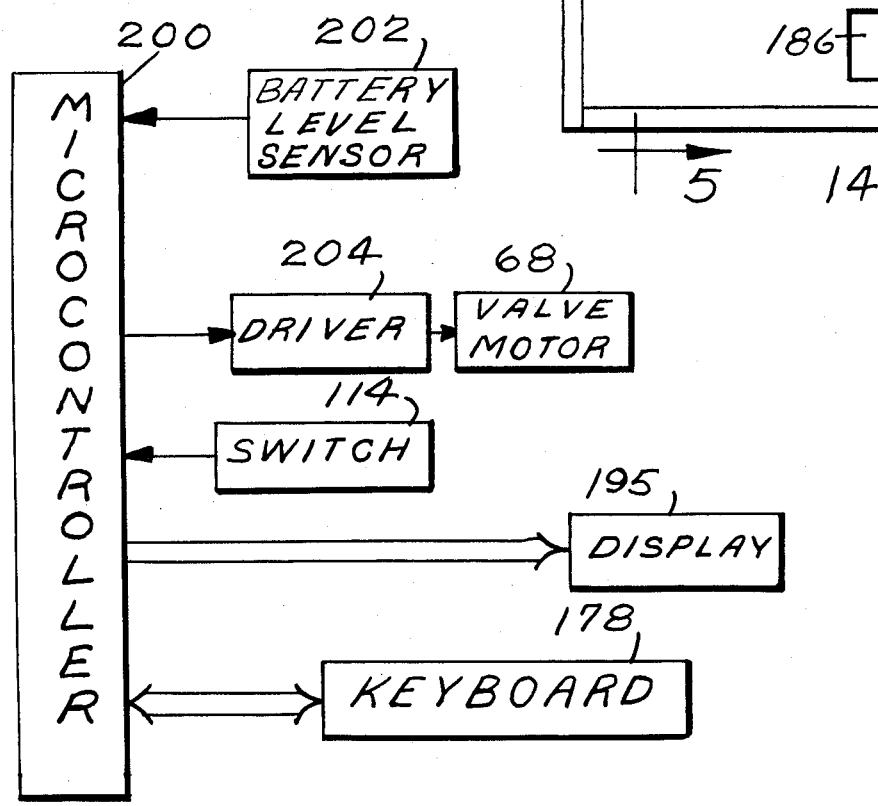
FIG. 6 is a block diagram of the control electronics.

In operation, when a start time is reached by the portable programming unit clock, the display shifts from the time of day as shown in FIG. 6 to a run time display, such as shown in FIG. 12. This run time display indicates to a user that the valve is open and that his lawn is presently being watered. Also, the display informs the user of the remaining run time in the particular watering sequence. The user can, of course, at any time terminate the particular sequence by pressing off button 186. This could be particularly advantageous if natural precipitation were occurring during a programmed water time.

With the above in mind, and with reference to FIGS. 6 through 11, the electronic components which are utilized to effect the operation in response to the pushing of the keys and the manner in which these components act to effect the functions will now be described.

As best shown in FIG. 6, the heart of the electronic component hardware is a microcontroller 200 which may be, for example, the LC 5850 microcontroller 200 manufactured by Sanyo. This particular microcontroller includes not only a central processing unit but also random access memory, read only memory and a sufficient number of input and output ports to enable connection to all necessary component elements as described below.

A battery level sensor 202 provides a signal to microcontroller 200 when batteries 154 powering the circuitry reach a dangerously low level. As will be described below, when the battery level sensor 202 generates a signal, the keyboard 178 and all automatic functioning are disabled, the ball valve 42 is closed and the display is turned off.

Microcontroller 200 provides a signal to a driver 204 which, in turn, powers motor 68 to adjust the valve 42. As has been decribed above, the position of the valve 42 is monitored by cam activated switch 114 which changes state every time the valve 42 turns 90°. Microcontroller 200 controls display 194. Also, microcontroller 200 interacts with keyboard 178 to determine when a key has been depressed.

To automatically control sprinkling, microcontroller 200 performs a program stored in its internal read only memory. Flow charts for this program are depicted in FIGS. 7-11.

A summary flow chart, showing a summary of the normal operation of the programs stored in the read only memory is shown in FIG. 7. When power is turned on at step 1000, an initialization sequence and default program is entered at step 1002. The main operating loop of the device begins at step 1004. This main operating loop includes updating time of day and other timers at step 1006. Then, a valve pending check is performed at step 1008. The term valve pending is used throughout this description to indicate that a valve movement has been commanded when the portable programming unit was not mounted or docked to the water control unit and that this command is still pending. If the program determines at step 1008 that the valve is pending, the pending command is caused to be executed at step 1010 if the programming unit is docked with the valve unit. Then, at step 1012, any pressed keys on the keyboard of the programming unit are executed. Throughout the operation of the stored program, a divider interrupt 1014 occurs every half second to perform various housekeeping functions. Other interrupts 1020 also occur at predetermined intervals throughout the programming sequence.

This summary explanation of the operation of the stored internal program is described in detail with reference to the following figures.

Figure 8A:
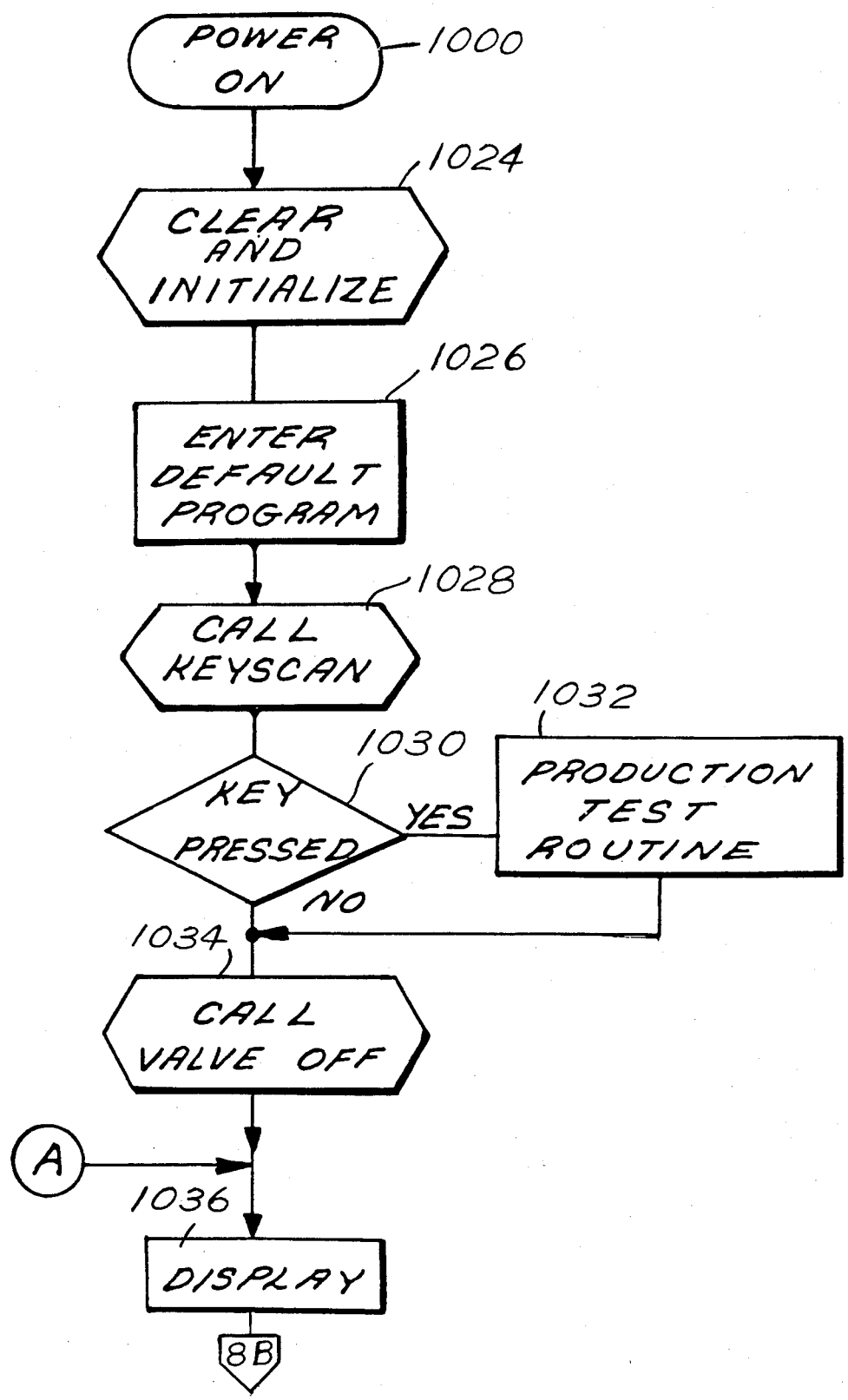

Upon power on at step 1000 in FIG. 8A, the execution of the stored program is initiated. All flags and registers are cleared and initialized at step 1024, and a default program is entered at step 1026. This default program includes the time of day being 12:00 a.m., the day of the week equaling Monday, all start times being nulls and all run times equaling 0:00. The day schedule for sprinkling days is set by the default program to be all days of the week on. However, as a result of this default program there will be no start times and no run times, so the sprinkler will never be turned on. After this default program is entered, the subroutine entitled "key scan" is called at step 1028. This subroutine scans the keyboard of the control unit to determine if any keys have been depressed and stores these keys. The key scan subroutine is discussed infra with reference to FIG. 10A.

The key scan subroutine also obtains an indication of whether any key on the control unit has been pressed. At step 1030 the presence of this key pressed indication is tested for. If the key has been depressed at this point, it represents to the program that a key was being pressed at the time that power on was initiated. In this embodiment, this condition is used to initiate a production test routine which tests the operation of the device to assure adequate quality control. The production test routine tests all the segments of the display, the programming keys and the output drivers to the valve.

At the end of production test routine 1032, or if a key has not been pressed at step 1030, the "valve off" subroutine is called at step 1034. This subroutine closes the valve, if it is open, thus ensuring that on power up or reset the valve assumes a closed position. This routine is discussed infra with reference to FIGS. 9A-C. At step 1036, the contents of a display register within microcontroller 200 are displayed on display 194. Since a default program has been entered at step 1026, the initial display will be "12:00" a.m. Sunday.

Figure 8B:
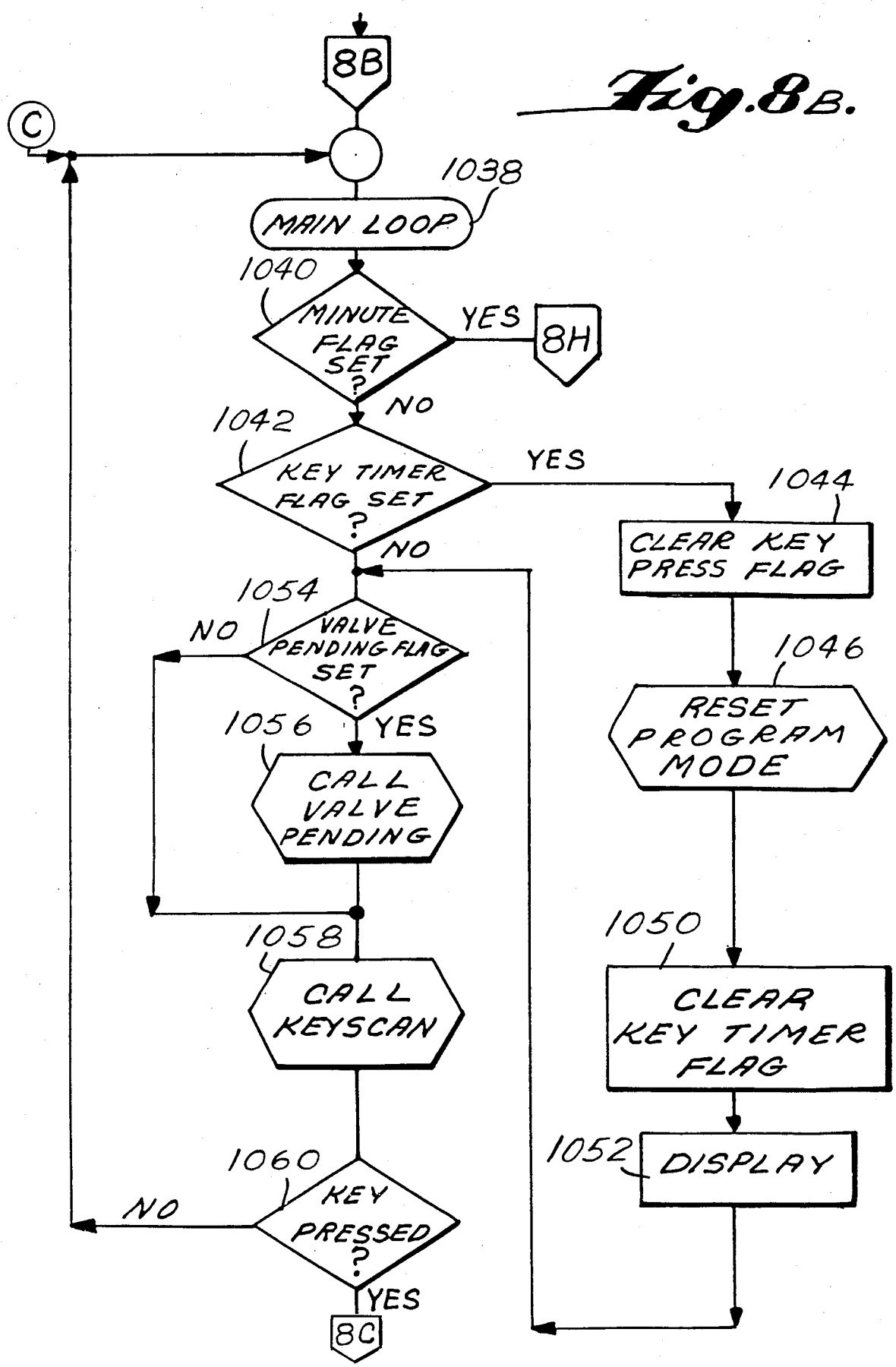

The flow sequence of the program then continues with FIG. 8B. FIG. 8B includes the main loop of the program which begins at point 1038. This main loop is the processing path which will be cycled through by microcontroller 200 during its idle time—that is—when no outstanding commands are pending (have been selected but not executed).

The main loop 1038 begins with a check of the minute flag at step 1040. This minute flag represents that a 60 second counter has elapsed. This 60 second counter is updated and tested during the divider interrupt 1014 which is described infra with reference to FIG. 11. If the minute flag is set, program flow is transferred to a routine which updates the clock and performs other functions. This routine is discussed with reference to FIG. 8H. If the minute flag is not set at step 1040, the presence of a key timer flag is tested for at step 1042. This key timer flag is also produced by divider interrupt 1014, and when active indicates that 64 seconds have elapsed since the last key was pressed. The key timer flag operates to clear any programming mode if the programming mode remains inactive (without keys pressed) for 64 seconds. This stops the flashing which indicates a programming sequence, and also allows auto-start to occur should a start time be passed. Thus, at step 1042, if the key timer flag is set, steps are taken to ensure that the programming mode is terminated.

When the key timer flag is set, control flows to step 1044 where a key press flag is cleared. This key press flag is set during a key execute sequence and indicates that a specific key has been selected. After the key pressed flag is cleared at step 1044, the program mode is reset at step 1046 and auto mode is entered or run mode if the valve is on. The key timer flag is cleared at step 1050. The updated information is then displayed at step 1052. Control then returns to the main loop to the same point as a negative outcome from the test of the key timer flag at step 1042.

If the key timer flag is not set at step 1042, or after the display step at 1052, the valve pending flag is tested for at step 1054.

A central feature of the present invention resides in the ability to remove the portable programming unit 14 from the water control unit 12. In so doing, commands and programming may be performed to the portable programming unit while it is disconnected from the water control unit. As discussed above, this has special advantages as a sillcock may not always be located in a location where it is convenient to a user to perform the programming operations necessary. However, if the portable programming unit is remote from the water control unit, commands initiated by the portable programming unit will not reach the water control unit so the valve will not be moved and hence water flow will not be effected.

Thus, when portable programming unit 14 is remote from water control unit 12, and a command is sent to the valve of water control unit 12 during this time, the valve pending flag is set. This flag indicates to micro controller 200 that a command has been sent to the valve which has not been executed yet, and is thus still pending. This valve pending flag is tested for at step 1054. If the valve pending flag is found to be set at step 1054 a "valve pending routine" is initiated at step 1056. This routine tests to see whether the portable programming unit 14 is docked with water control unit 12, and if the two are docked executes the pending command. The valve pending routine is discussed in detail infra with reference to FIG. 9A.

The next step in the main loop occurs at step 1058 where the "key scan" subroutine is called. This subroutine tests to see if any keys have been depressed and stores these keys along with a key pressed flag. The presence of this key pressed flag is tested for at step 1060. If a key has not been pressed at step 1060, control is passed to point C which reenters the main loop at step 1038. Thus, during the normal case where the minute flag is not set, the key timer flag is not set, the valve pending flag is not set, and no key has been pressed, the main loop extending from steps 1038 and 1060 is cyclically executed.

Figure 8C:
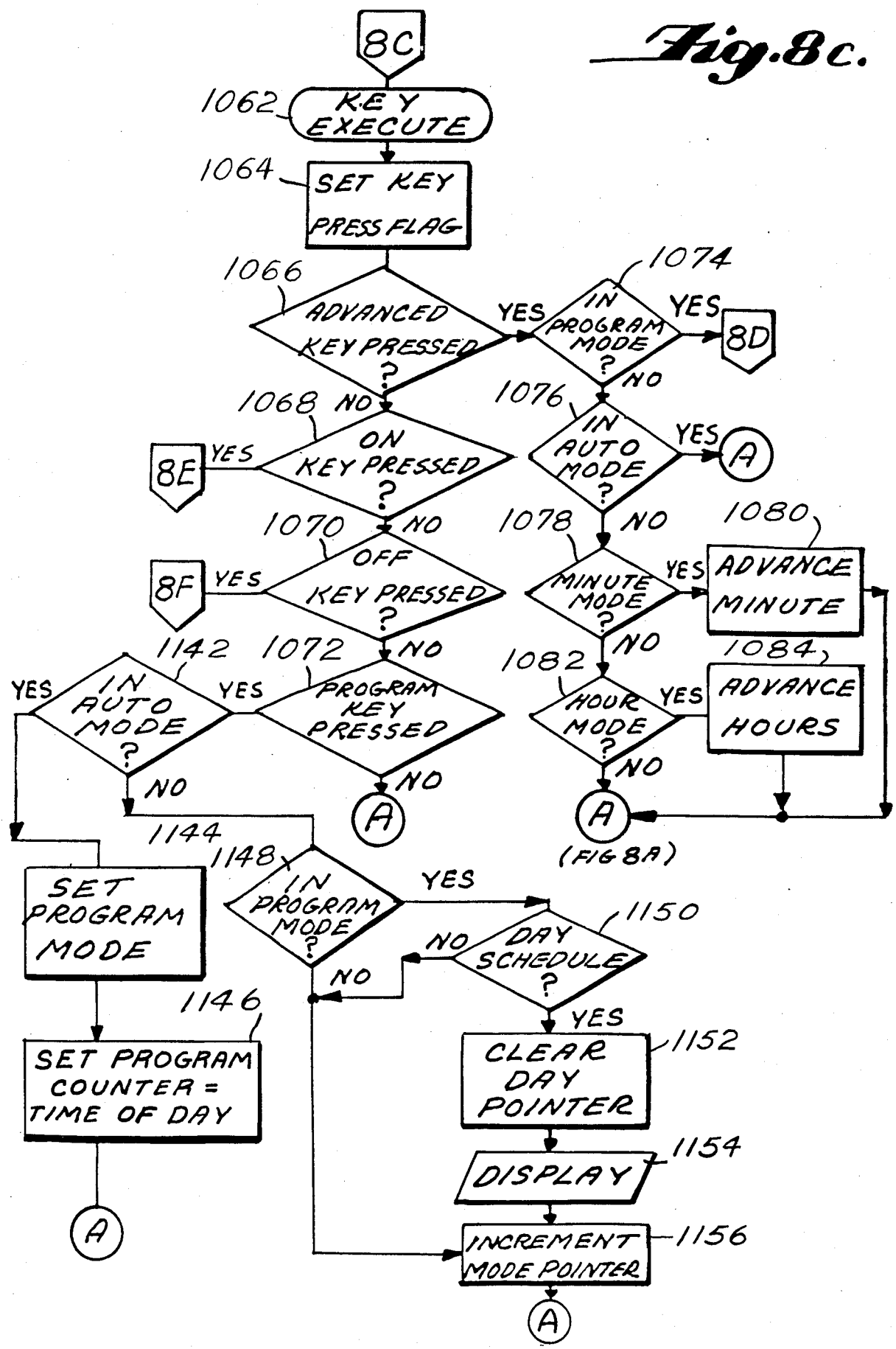

If a key has been pressed at step 1060, however, program control passes to a key execute sequence which is shown in FIG. 8C. The key execute sequence begins at point 1062, and since a key has been pressed, the key pressed flag is set at step 1064. As drscussed above with reference to the main loop, if 64 seconds elapses without another key being pressed, this key press flag is cleared at step 1044.

As discussed above, the best mode of the present invention uses a portable programming unit which has four keys. These keys are labelled program, advance, on, and off. Thus, the key execute routine checks whether any of these keys have been pressed. The advance key is tested for at step 1066 with the on, off and program keys being tested for at steps 1068, 1070 and 1072 respectively.

The operation of the programming of microcontroller 200 uses the four keys to program any desired combination of run times and run days. To program a sequence, the program button is depressed which causes the microcontroller to enter program mode. Repeated pressings of the program key then cycle through the different possibilities of parameters which can be programmed into the microcontroller device. When a desired mode of programming is reached in the program mode, depressing the advance key advances this parameter. Also, in the case of a watering day, the on and off keys are used to indicate whether the day used is on (a watering day) or off (not a watering day). Thus, by using a multiplex function, the entire programming sequence can be accomplished with only four controls being used. The program described infra performs this sophisticated function.

The program initially tests for the advance key being pressed at step 1066. If the advance key is pressed, a further test to determine whether program mode has been initiated is performed at step 1074. If microcontroller 200 is not in program mode at step 1074 a further test of whether auto mode is in progress is performed at step 1076. If microcontroller 200 is in auto mode at step 1076, control is returned to point A in FIG. 8A, which causes an updated display function and then returns to the main loop (to step 1038). However, if microcontroller 200 is neither in program mode nor in auto mode, meaning the valve is on and run time left is displayed, minute mode is tested for at step 1078. If the device is in minute mode, the minutes are advanced at step 1080. Similarly, if the device is not in minute mode at 1078, hour mode is tested for at step 1082. If the device is in hour mode, the hours are advanced at step 1084. If the device is not in hour mode, or after hours or minutes have been advanced in steps 1084 or 1080, control is again returned to point A in FIG. 8A.

Figure 8D:
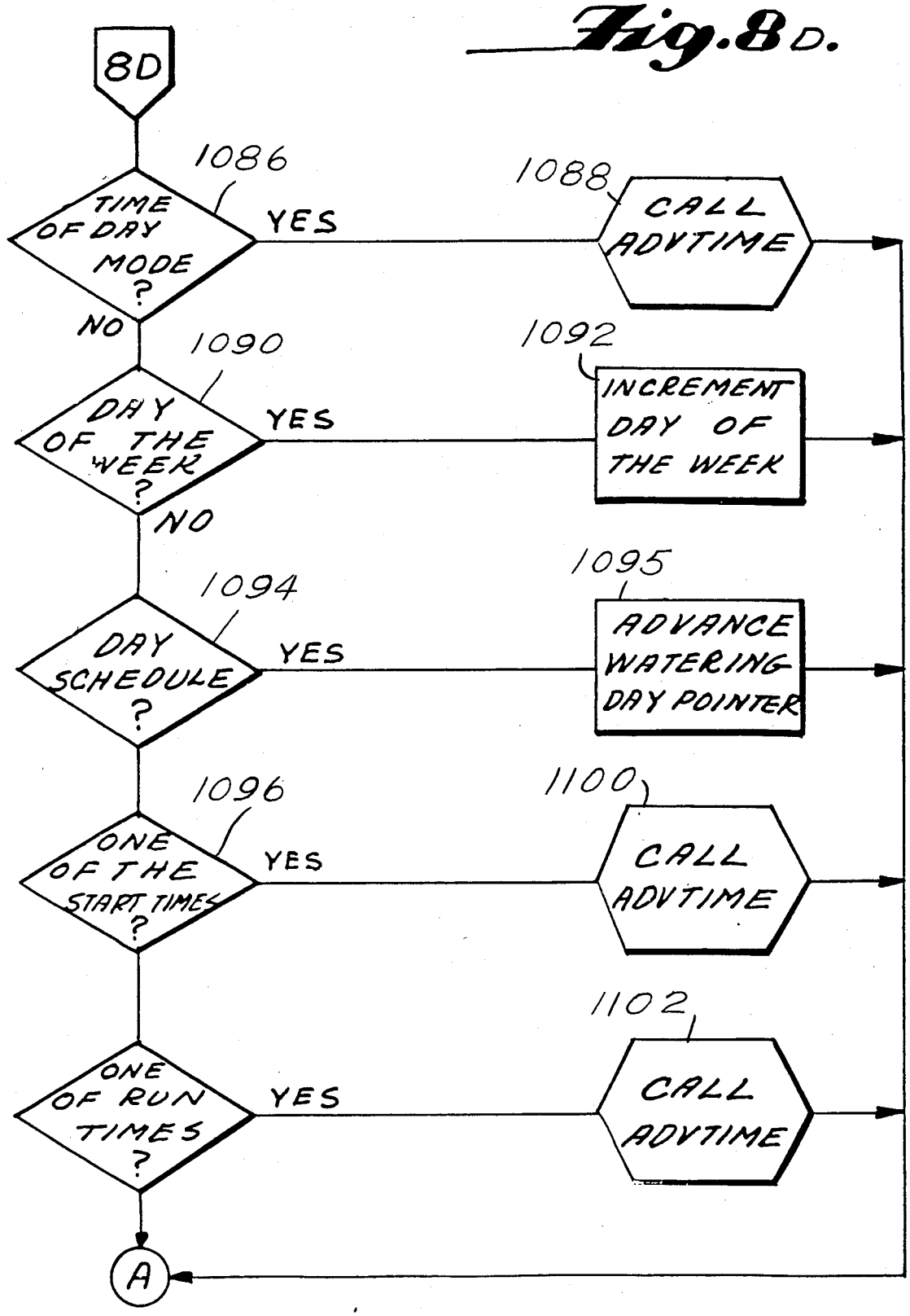

If, at step 1074 microcontroller 200 is determined to be in program mode after the advance key is pressed, control passes to FIG. 8D. This indicates that the device is being programmed, and that the advance key is commanding that a parameter should be advanced. At step 1086, the program tests to see if microcontroller 200 is in time of day mode. If so, the "Advtime" subroutine is called at step 1088 which advances the proper parameter of the time of day. Control is then passed to point A which displays the new parameter and returns to the main loop. If the device is found not to be in time of day mode at step 1086, day of the week mode is tested for at step 1090. If day of the week mode is positive, the day of the week is incremented at step 1092 and control passes to point A. If not, day schedule mode is tested for at step 1094. If the device is in day schedule mode, the depressing of the advance key operates to shift the blinking day at step 1095. The blinking day indicates the day which can be turned on or off as a watering day. Turning a day on or off as a watering day is accomplished with the on and off controls and is discussed infra. By pressing the advance key in day schedule mode, the day being indicated is merely advanced without changes. After the watering day pointer is advanced in step 1094, control again passes to point A.

If the device is not in day schedule mode, the program then tests to see whether the device is in the mode to advance one of the start times at step 1096. The present embodiment uses three start times, start time 1, start time 2 and start 3. If one of the start times is not indicated, the run times are then tested for at step 1098. If either the start times or the run times are indicated, the "advtime" routine is called at steps 1100 and 1102. Control then passes to print A.

Thus, in summary, if the advance key is pressed while in program mode, the microcontroller performs tests to determine which of the different possible modes is being commanded to be advanced. When the proper mode is ascertained, a parameter of this mode is altered. Thus, the advance key is used in a multiplex fashion to control a plurality of different functions.

Figure 8E:
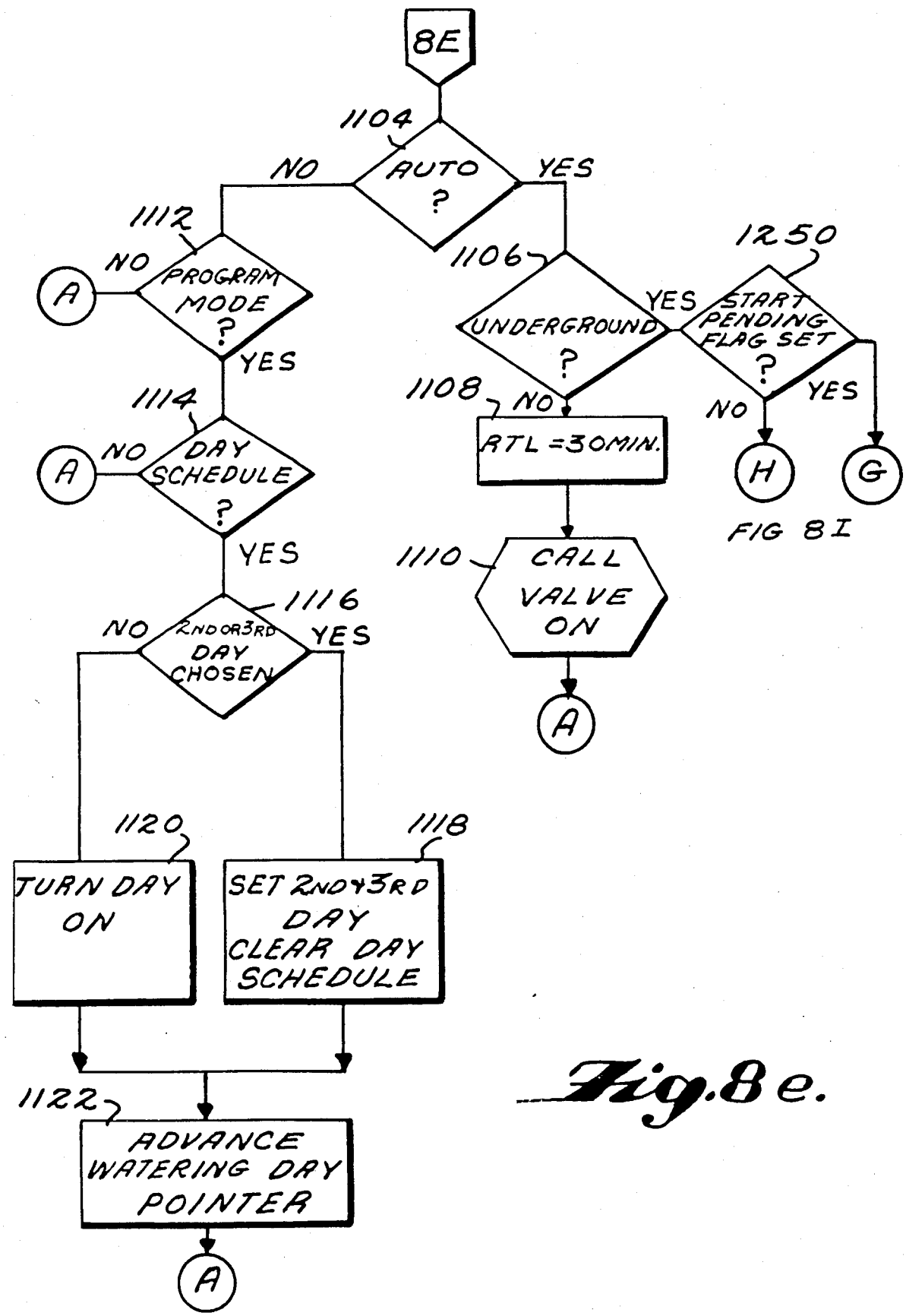

Returning again to FIG. 8C, if the advance key was not pressed at step 1066, the program tests for the on key having been pressed at step 1068. If the on key is pressed, control passes to FIG. 8E. In FIG. 8E, the program first tests whether the device is in auto mode at step 1104. If the device is in auto mode at step 1104, depression of the on button indicates a manual operation, to manually turn the valve on for a period of 30 minutes. At step 1106 the plural lawn sprinkling system option is tested for. This plural lawn sprinkling system option will be discussed infra. If the device is not in plural lawn sprinkling system option at step 1106, the run time left register or RTL is loaded with a period of 30 minutes at step 1108. The valve on subroutine is then called at step 1110 which operates to turn the valve on, and then control is returned to point A.

However, if the device is not in auto mode at step 1104, pressing the on key may indicate that the day schedule is being altered. Therefore, at step 1112, the program checks whether the device is in program mode, and if not, control returns to point A. If it is in program mode is step 1112, the program tests to see if it is in day schedule mode at step 1114. If not, control is again transferred to point A. However, if the device is in program mode, and in day schedule mode, the day schedule is being altered by the depression of the on key at step 1068. To effect this, the second or third day pointers are tested for at step 1116. These pointers indicate that water should be turned on every second day or every third day respectively. If the pointer is pointing at one of these options when the on button if pressed, this option is selected, and the day set schedule is cleared. The day set schedule must necessarily be cleared because individual days being programmed is inconsistent with the every other day or every third day command which was initiated. These steps are performed at step 1118. If the second or third day options have not been chosen at step 1116, the particular day being pointed to is turned on, and the second or third day option is cleared at step 1120. After either step 1118 or 1120 is executed, the watering day pointer is advanced at step 1122 and control is returned to point A.

Returning back to FIG. 8C, if the program determines that the on key was not pressed at step 1068, the depression of the off key is tested for at step 1070. If the off key has been pressed at step 1070, control passes to FIG. 8F.

Figure 8F:
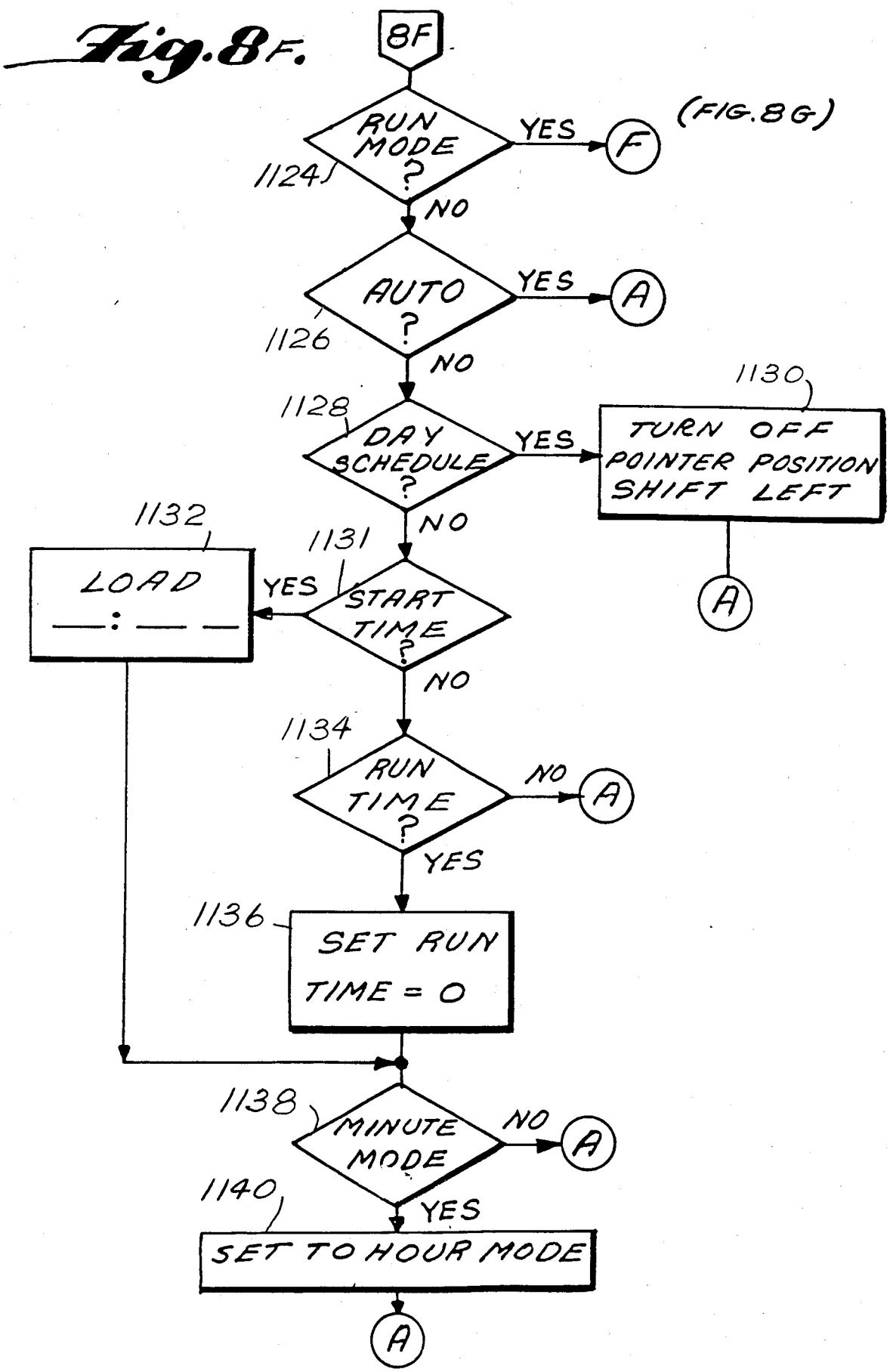

FIG. 8F represents the microcontroller ascertaining the proper function to be performed by the depression of the off key. If the device is in run mode as tested for at step 1124, control is passed to point F in FIG. 8G where the valve off routine is called at step 1127. The plural lawn sprinkling system option is tested for at step 1127 and if the plural lawn sprinkling system option is not selected, control is returned to point A. The plural lawn sprinkling system option will be discussed infra.

Thus, in run mode, when the off control is depressed, the valve is turned off. At step 1126, the program tests the device for auto mode. If the device is in auto mode, control returns to point A as the off button in this mode will have no function. At step 1128, the day schedule mode is tested for. Similarly to the on function described with reference to FIG. 8E, the days in the day schedule mode can be selectively turned on and off by use of the on and off buttons. Therefore, if day schedule mode is selected, the day corresponding to the pointer position that is indicated is turned off and the day being pointed to is shifted at step 1130. Control is then returned to point A. If the device is not in day schedule mode at step 1128, the program checks whether the device is in one of the start time modes at step 1131. If microcontroller 200 is in a start time mode, depression of the off button loads a null value into a particular register at step 1132. This null value appears in the display as -:--. After this null value is loaded into the register, the control program passes to a point discussed below. However, if the device is not in start time mode, a test to determine whether the device is in run time mode is performed at step 1134. If the device is in run time mode at step 1134, the depression of the off button sets the run time equal to 0. When this run time is equal to 0, the program flow passes to the same location as after the nulls were loaded in step 1132. At this point, the program checks to see if the device is in minute mode at step 1138. If the device is not in minute mode at step 1138, control again returns to point A where the contents of the register are displayed and the main loop is again executed. If the device is in minute mode, hour mode is at step 140 and control is also transferred to point A. Therefore, the run or start time is left with the pointer facing an hour indication.

Returning again to FIG. 8C, step 1072 checks to see if the program key is the key that was depressed. This is the final choice, as in this embodiment there are only 4 keys. Therefore, if the program is not depressed at step 1072, control returns to point A. However, if the program key is depressed at step 1072, the program checks to determine if the device is in auto mode at step 1142. If the device is in auto mode, program mode is set at step 1144 and the program counter is set to be equal to the time of day at step 1146. Control then passes to point A. If the device is not in auto mode at step 1142, the program checks at step 1148 to determine if it is in program mode. If it is at program mode in step 1148, the program checks to see if it is in day schedule mode in step 1150. If there is a positive outcome to this test, the day pointer is cleared at step 1152 and the new information which is the whole day schedule displayed at step 1154. If the device is not in program mode at step 1148 or is not in day schedule mode at step 1150, or after the display step of 1154, the mode pointer is incremented at step 1156 so that a new mode is assumed by microcontroller 200. Control then returns to point A.

Returning to FIG. 8B, at step 1040, the presence of the minute flag being set was tested for. If the minute flag is set at step 1040, control transfers to FIG. 8H so that the clock can be incremented.

Figure 8G:
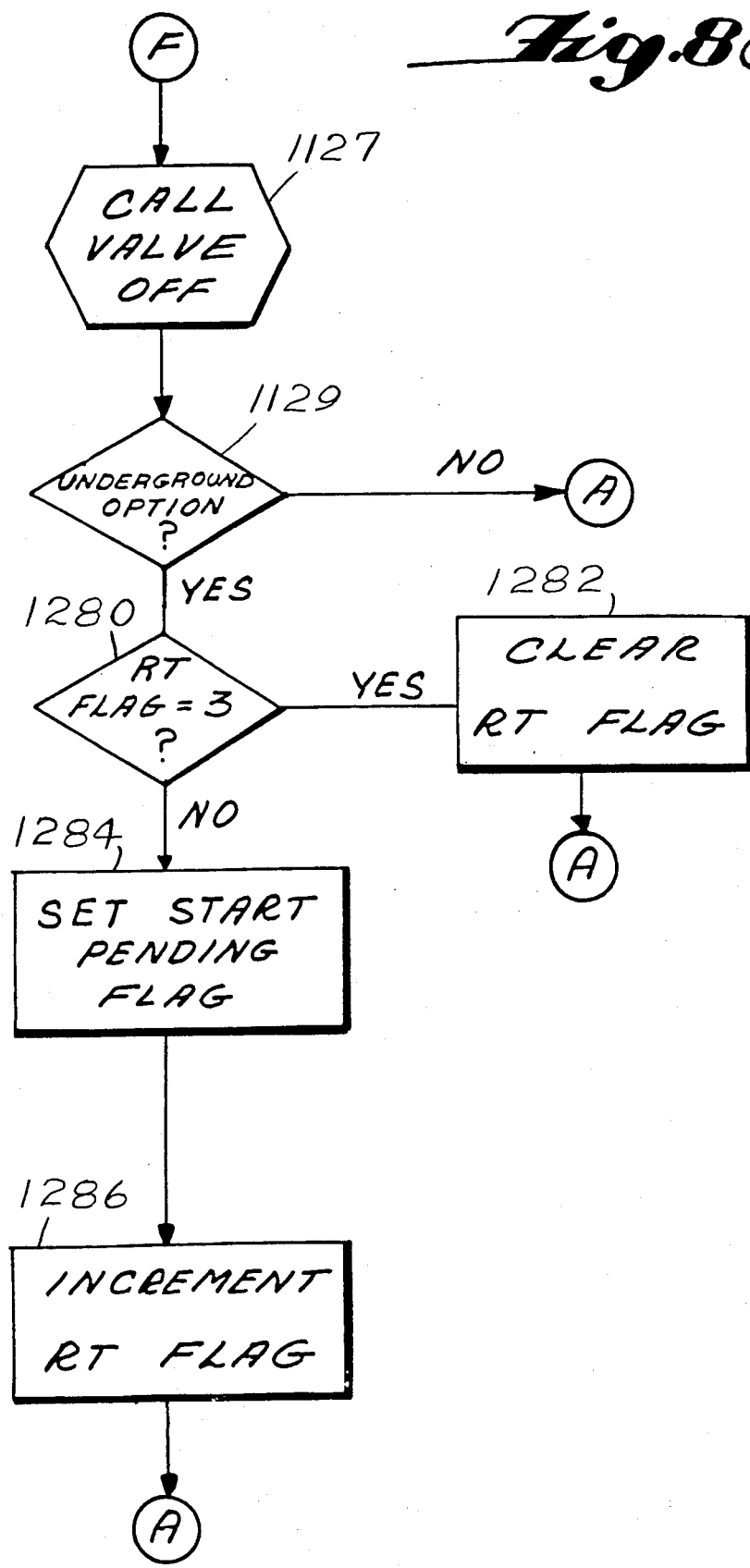
Figure 8H:
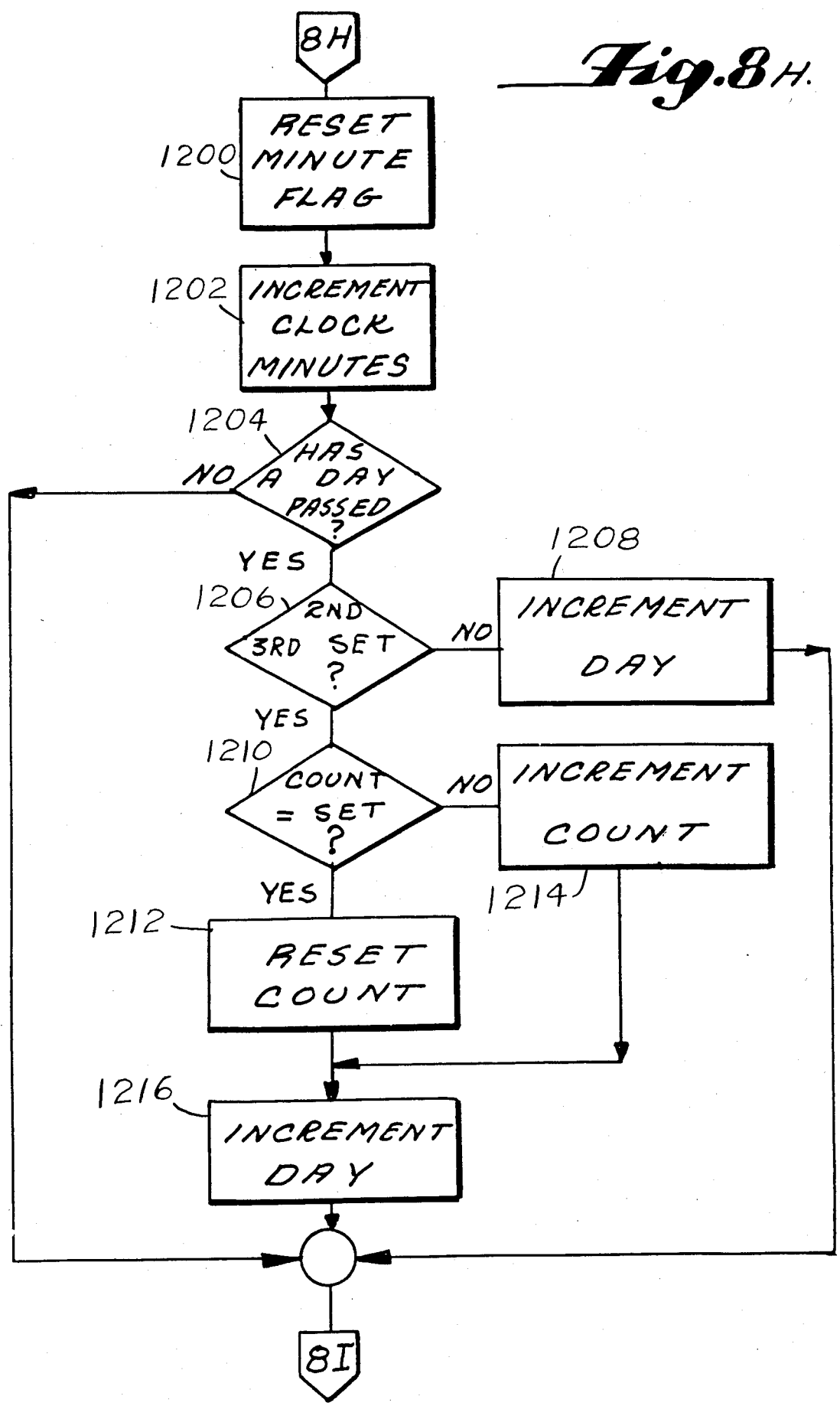

Referring to FIG. 8H, the minute flag is initially reset at step 1200. Then, clock minutes must be incremented, which is performed at step 1202. At step 1204, a test is performed by the program to determine whether a day has passed. If a day has not passed, control passes to FIG. 8I. If a day has not passed, however, the program performs a further test at step 1206 to determine whether the second or third day options are set. If these options are not set, the day is merely incremented at step 1208 and control passes to FIG. 8I. However, if the second or third day options are set, the program must determine whether the day which has just begun is a watering day. Since watering days in the second and third day option occur either every second day or every third day, a count is kept of days without watering. Therefore, if the every third day option is set, two days will pass without watering before a watering day is detected. Then, the third day is determined to be the watering day. Therefore, at step 1210 the program tests this running count to determine whether it is equal to the option which is set. For instance, if the third option is set and the count equals three (indicating that this is the third day since watering), then the day which has just begun is a watering day. Then, at step 1212 the count is reset. However, if the count is not equal to the set option, at step 1214 the count is incremented. At step 1216, the day count is incremented irregardless of whether the count is equal to set. Then, control transfers to FIG. 8I.

Figure 8I:
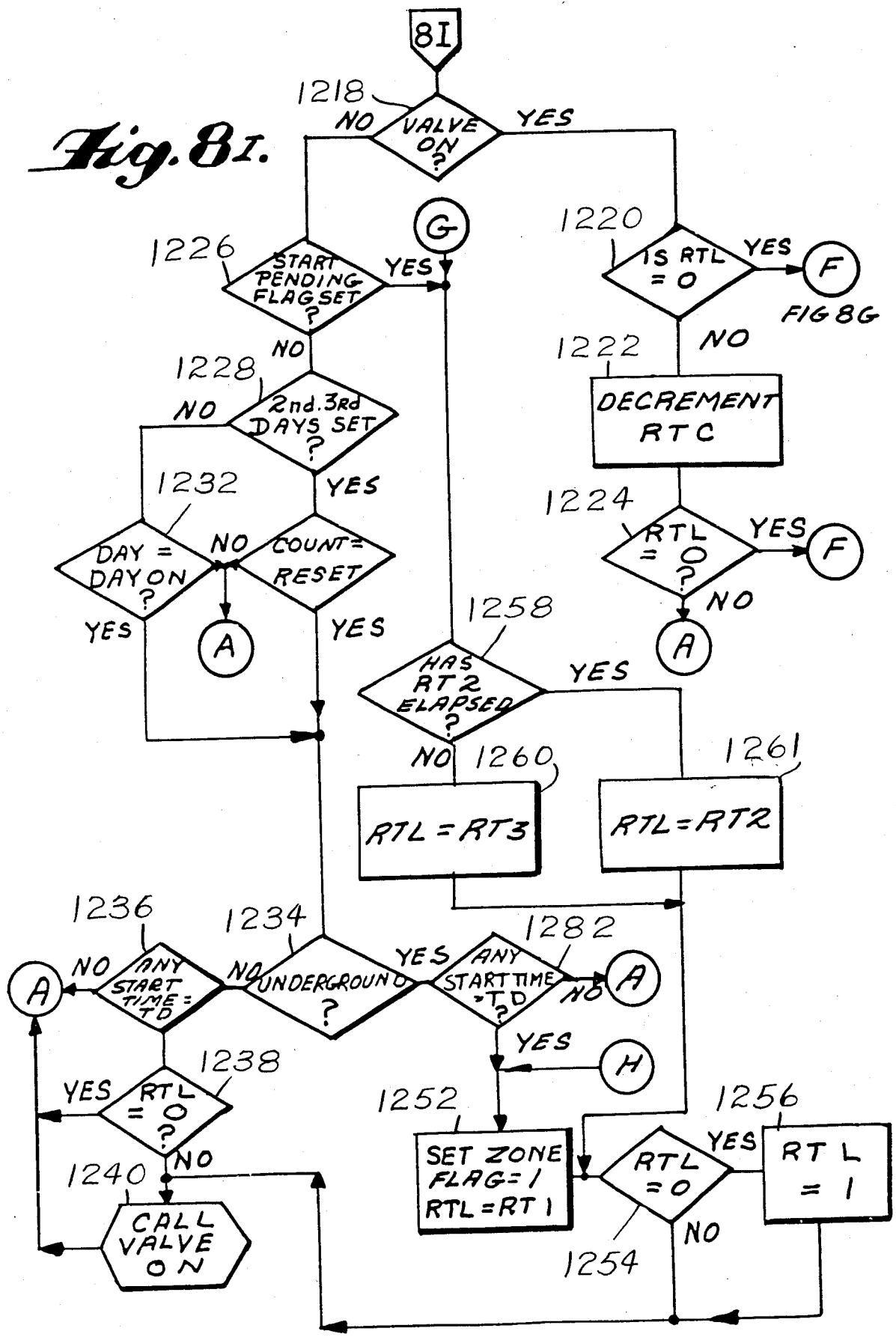

In FIG. 8I, the operating conditions are such that a minute has passed, and if a day has passed the day counter has been incremented. Initially then, at step 1218, the program checks if the valve is in the on position. This test determines the further actions of the program in response to the passing of another minute. If the valve is determined as being on at step 1218, at step 1220 the program tests to see if the run time left (RTL) is equal to zero. If the run time left at step 1220 is equal to zero, control transfers to point F in FIG. 8G. However, if the run time left is not equal to zero, run time left is decremented at step 1222 and again tested for equality with zero at step 1224. This run time left is checked twice because in the interim time that has elapsed between checking at stop 1224, and checking on the next pass at step 1220, a user may have manually set run time left equal to zero. In such a case, decrementing run time left should not be done. If run time left is equal to zero at step 1224, control again transfers to point F in FIG. 8G where the valve is turned off. However, if run time left is not equal to zero at step 1224, control transfers to point A in the main loop of the program. Thus, in summary, if the valve is on at step 1218, when a minute passes, run time left is decremented and tested for equality with zero, and if equal to zero the valve is closed.

However, if the valve is not on at step 1218 the program tests at step 1226 to see if the start pending flag is set. The start pending flag relates to the plural lawn sprinkling system embodiment which will be described infra. If the start pending flag is not set, the program must then decide if the present day is a watering day. At step 1228 the second and third day options are tested. If either of the second or third day options are set, the count is tested for equality with the reset valve at step 1230. If count has not been reset (see step 1212 in FIG. 8H) at step 1230, "today" is not a watering day and control returns to point A. If the second or third day options are not set at step 1228, at step 1232 the day is tested to determine if "today" is an on day. If not, control also passes to point A. However, if count is equal to set at step 1230 or if "today" is equal to an on day on at step 1232, then "today" is a watering day, and a further test of whether the plural lawn sprinkling system embodiment is active is performed at step 1234. If the plural lawn sprinkling system option is not selected, the program then tests at step 1236 whether any start time which is set is equal to the time of day (or TD). If not, start time is equal to the time of day, and control again returns to point A. However, if any start time is equal to the time of day, it indicates that a valve should be opened if the run time left is greater than zero.

Therefore, at step 1238 the program tests to see if any run time left is greater than zero. If run time left is greater than zero, the valve on routine is called at step 1240. If run time left is equal to zero, or after the valve on routine is called at step 1240, control again returns to point A.

One advantage of the apparatus described within the specification is the ability to water in a most optimal fashion. To this end, the three start and run times available allow a user to sequentially water for specified periods, up to three times during the day. This allows optimal absorption of the water into the ground and minimal amounts of runoff. However, another common requirement is to sequentially water different zones or areas of irrigation space. Frequently, a user will have only one hose or sillcock which can be connected with, and thus, only a limited amount irrigation space can be covered with the fixed amount of water pressure available to this user. Therefore, if a user desires to water different areas at different times, it would be advantageous to be able to perform this function sequentially.

Another embodiment of the present invention is referred to throughout the flow charts as the plural lawn sprinkling system embodiment. This title refers to this embodiment being especially applicable for a system that time divisionally routes water to different sprinklers disposed at different locations. More specifically, this embodiment is used to sequentially route water by means of a stepping valve or the like to a plural number of hoses and associated sprinklers in a time-divisioned fashion. These plural hoses and sprinklers are referred to herein as "areas" since each sprinkler can be positioned to cover a selected area. This plural lawn sprinkling system embodiment can use a program similar to the main embodiment, with control flowing to different branches in the flow chart than in the main embodiment. As is hereinafter more fully explained, the stepping valve is operable in response to a closing of the water control unit valve to move from an open position with respect to a predetermined hose and sprinkler into an intermediate position with respect to the hoses and sprinklers. Thereafter the stepping valve is operable in response to the turning on of water to move to another open position thereby routing water to other ones of the hoses and sprinklers. The programming achieves this routing of water to different hoses and sprinklers by causing the stepping valve to step between different locations by turning the water pressure off for a one minute interval. Thus, this program functions to provide for a cycling of the water valve on and off to sequentially route water to different sprinklers.

In this embodiment, a predetermined number of areas of watering, each area corresponding to a lawn sprinkler which can be relocated at the selection of the owner, is programmed into the device. For the description throughout the specification the number of areas is three. Thus, whenever a start time is programmed by the user, in this plural lawn sprinkling system mode, the user intends for all three areas to be watered. However, due to the above mentioned problem of possible lack of water pressure, these areas must be watered time-sequentially.

Therefore, the plural lawn sprinkling system embodiment of the present invention provides the function of performing three separate watering operations for each watering-on time that is encountered. For example, a 15 minute run time will cause 15 minutes of watering to the first hose and sprinkler, followed by 15 minutes of watering at hose 2 followed by 15 minutes of watering at hose 3. In between these 15 minute watering intervals is a one minute shut off period which allows an valve to index between the different selected hoses and sprinklers so that the next area is automatically selected.

Thus, while this system is similar to an existing underground system heretofore known, an above ground system of comparable function has not been available commercially or proposed in the patented literature. Above ground systems provide operators with the capability herein described which are thus not available to operators of underground systems. Namely, the ability to select different watering areas which can change on a daily basis by merely changing the location of an above ground sprinkler cannot be accomplished with an underground watering system. Moreover, above ground systems perform these added functions in addition to the functions which are normally performed by an underground system. All of these advantages are performed without the additional added cost of installing an underground system. Also, the ease of configuration and sizing of the system brings such an automatic plural lawn sprinkling system within the means of many who would be unable or unwilling to suffer the cost and necessary digging and installation of a true underground system. Therefore, this plural lawn sprinkling embodiment finds a market which could not be filled by the underground system.

Returning to the flow charts of FIGS. 8A–I, the plural lawn sprinkling system option and operation thereof will be described herein.

Referring to FIG. 8E, what is perhaps the most straightforward application of the plural lawn sprinkling system embodiment will now be described. FIG. 8E encompasses the situation where the on control is depressed while the device is in normal operation. In plural lawn sprinkling system or "normal" control, depression of this on key would turn on the valve for a run time of 30 minutes. However, if the plural lawn sprinkling system option is active in step 1106, the presence of the start pending flag is tested for at step 1250. The start pending is a flag which is set during the plural lawn sprinkling system mode, and which indicates that the first zone has already been completely watered.

Depending on the outcome of the start pending flag tested at step 1250, control transfers to different locations in the flow chart of FIG. 8I. In the case where the start pending flag is not yet set, no areas have yet been completely watered. Thus, control transfers to point H, where the zone flag is set equal to one at step 1252 indicating that zone 1 is to be watered. Then, the run time left is set equal to run time 1. At step 1254 the program tests the run time left for equality to zero. If run time left is not equal to zero, the valve on routine is called in step 1240. If run time left is equal to zero however, at step 1256 run time left is set equal to one so that the valve can turn on for 1 minute, which is a minimum default period for valve turn on to ensure that the indexing valve will properly operate. Then, control also transfers to step 1240 where the valve is turned on.

If the start pending flag is set at step 1250, it indicates that at least one area has completed watering operation and the one minute period between the different areas being watered is now in progress. In this case, control transfers to location G in FIG. 8I. This same location is transferred to if the start pending flag is determined to be set at step 1226. In this case where the start pending flag is set, it is known that at least the first zone has been fully watered. Therefore, it is known that the first run time is already elapsed. Therefore, at step 1258 the program tests to see if the second run time has elapsed. If the second run time has elapsed, run time left is set equal to run time 3 at step 1260. However, if the second run time has not elapsed, the run time left is sent equal to this second run time at step 1261. Control then transfers to the decision block at step 1255 where run time left is tested for equality with zero followed by the valve being turned on at step 1240. Thus, the presence of the start pending flag at either steps 1226 or at step 1250 causes the next run time of the valve to be executed.

The operation when the off key is actuated in an plural lawn sprinkling system embodiment will now be described with reference to FIG. 8G. If the off key is detected as being pressed at step 1070 in FIG. 8C, and the run mode is detected as being engaged in FIG. 8F at step 1124, control transfers to location F in FIG. 8G. At step 1128, after the valve has been turned off, the plural lawn sprinkling system embodiment is tested for. If the device is plural lawn sprinkling system configured at step 1280, the run time flag is tested for equality with three at step 1128. If the run time flag is three, the run time flag is cleared at step 1282 and control is passed to point A. However, if the run time flag is not equal to three, meaning that all areas have not yet been watered, the start pending flag is set at step 1284 and the run time flag is incremented at step 1286. Then, control is again passed to point A. The result of this is that if the off button is pressed in an plural lawn sprinkling system embodiment, and all areas have not yet been watered, the valve is temporarily turned off and the indexing valve is rotated, so that the next irrigation area is watered in sequence. Therefore, the off button will not terminate the entire sequence but will only terminate the watering sequence of one particular hose. The branch F of the flow chart (FIG. 8G) is also used to cause an indexing operation of the valve when the run time left is equal to zero in a particular zone. In FIG. 8I, after a minute has passed, and the valve is on, if the run time left is equal to zero control passes to point F in FIG. 8G. Thereafter, the valve is temporarily turned off at step 1127. If the device is determined to be an plural lawn sprinkling system embodiment in step 1127, the run time flag is incremented and the start pending flag is set. The start pending flag being set causes the incrementation of the zone which is currently being watered as discussed.

A final discussion of the plural lawn sprinkling system embodiment is now given with reference to FIG. 8I. When a minute has passed and the valve is not on, nor is the start pending flag set, today is a watering day, and the plural lawn sprinkling system embodiment is tested for at step 1234. If the plural lawn sprinkling system embodiment is on at this point, rather than testing for start time equal to the time of day at step 1236, this test is performed at step 1282. If any start time is equal to the time of day, a sequence described above with respect to branch H of FIG. 8I is executed, causing the zone flag to be equal to one and the valve to be opened.

The program controlling the valve movement operations will be discussed with reference to FIG. 9A.

Figure 9A:
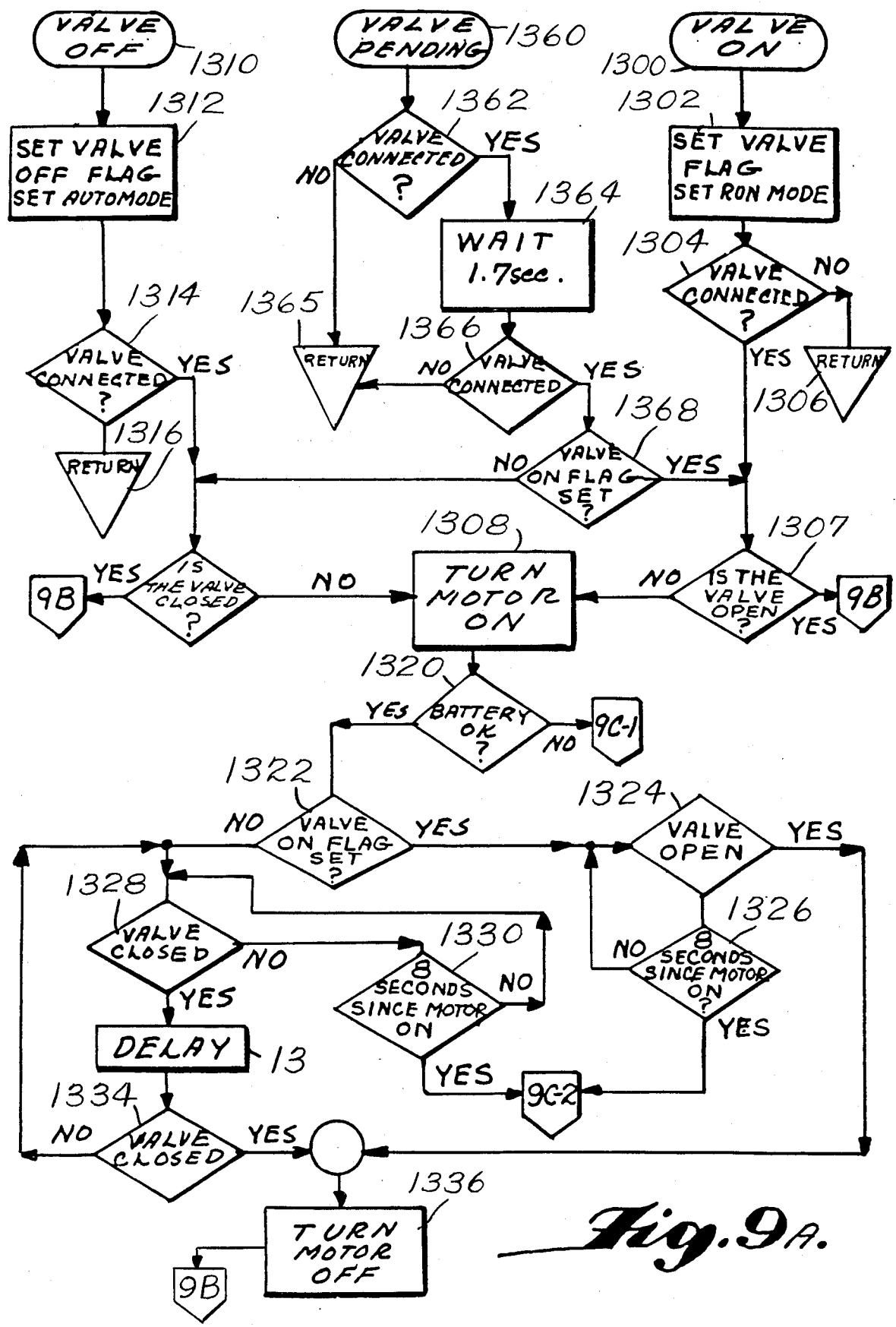
Figure 9B:
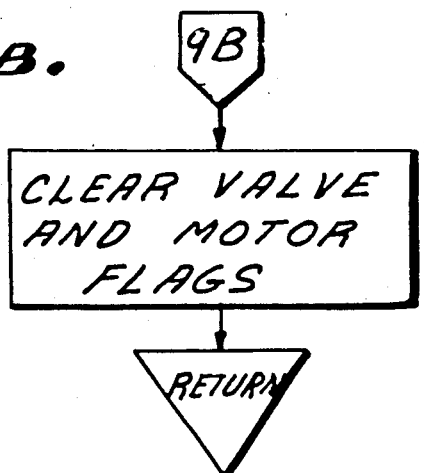
Figure 9C:
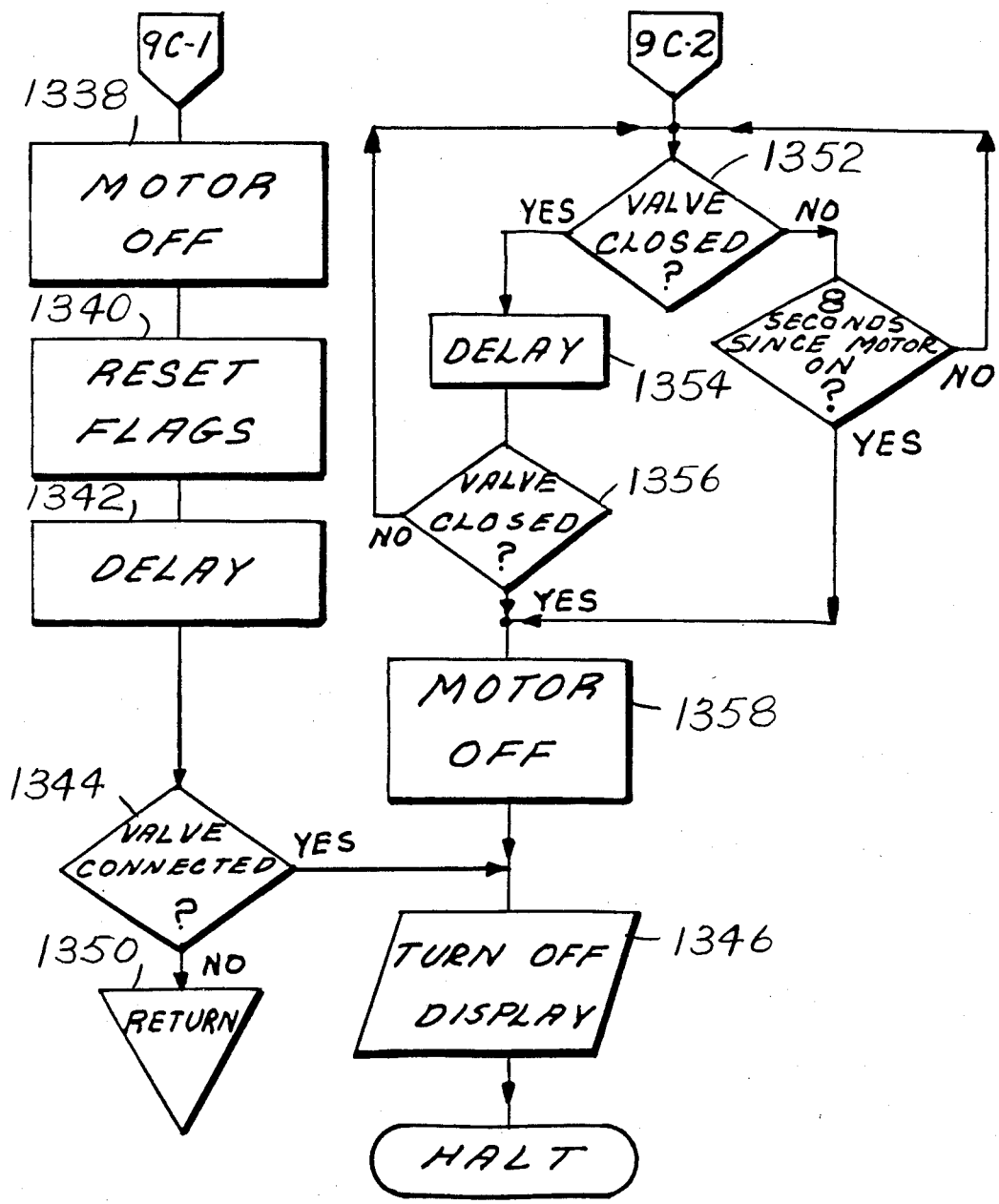

The flow chart of FIG. 9A explains diagrammatically the three subroutines referred to throughout the flow charts as valve on, valve off and valve pending. The valve on subroutine is the routine used when the valve is desired to be turned on. Similarly, valve off selects the operation which turns the valve off. However, when either of these routines are executed, if water control unit 12 is not docked with portable programmable unit 14, the valve operation cannot be effected. Therefore, a flag titled valve pending is set, which indicates that a command has been executed but has not been completed. This valve pending flag will cause the program on the next pass when the portable programming unit 14 and the water control unit 12 are docked to execute the valve pending routine. The valve pending routine causes this command which has been executed but not completed to be fully completed.

Referring to FIG. 9A, the valve on routine will be described first. The valve on routine begins at location 1300. At step 1302, the valve on flag is set and the device is altered to be in run mode. At step 1304 the program tests to see if the valve is connected —that is if the water control unit 12 is docked with portable programming unit 14. If the two are not docked, the main program is returned to at point 1306. The main program is returned with a valve on flag being still set. However, if control unit 12 is docked with programming unit 14 at step 1304, at step 1307 the program tests to see if the valve is open. If the valve is not open at step 1307, the valve motor is turned on at step 1308. Turning the motor on causes the valve to advance one position. Since the valve is not opened at step 1307, turning the motor on will cause the valve to open under normal circumstances.

The valve off routine will now be discussed until step 1308 where the motor is energized. Valve off routine begins at location 1310. Initially, the valve off flag is set at step 1312 and the device is placed in auto mode. The program tests for a valve connection at step 1314 and if the valve is not connected returns to the original calling location (in the main program) at step 1316. However, if the valve is connected at step 1314, the position of the valve is tested at step 1318. If the valve is not closed at step 1318, the motor is turned on at step 1308.

After the motor is turned on at step 1308, a battery test is executed by the program at step 1320. If the battery is sufficiently energized at step 1320, the valve on flag is tested for at step 1322. The valve on flag being set at step 1322 causes the program flow to branch to the right. At step 1324 the valve is tested to see whether it is opened. If is not opened, a test is performed at step 1326 to see if 8 seconds have elapsed since the motor was turned on at step 1308. If 8 seconds have not elapsed, the program flow returns to step 1324 where the valve open is again tested for.

If the valve on flag is not set at step 1322, the program flow branches to the left where the valve is tested at step 1328 to determine if it is closed. If the valve is not closed, at step 1330 the program tests to see if 8 seconds have elapsed since the motor has been turned on. If not, program flow returns to step 1328 where the valve is tested for closure again. If the valve is closed at 1328, a delay is caused by the program at step 1332 and the valve is again tested for closure at step 1334. These extra steps provide a debounce function to the valve closure to ensure that it is indeed closed.

If the valve is closed at step 1334 or the valve is opened at step 1324, the motor is turned off at step 1336. After this motor turn off, the program flow is transferred to FIG. 9B. At step 1338 the valve and motor flags are cleared indicating that the valve sequence is completed. Then, program flow returns to the point from which the subroutine was called at step 1340. However, if an item of extraneous matter is blocking the operation of the motor ball valve so that the valve cannot completely turn on or off, the valve movement will not complete the operation in 8 seconds. In this condition, a positive outcome will be output from the tests performed performed at steps 1326 and 1330. In the event of a positive outcome from these steps, control passes to FIG. 9C to location 9C-1. In this case, the motor is turned off at location 1338, all flags are reset at step 1340, and a delay is caused at step 1342. At step 1344 a final test is made to determine if the valve is connected. If the valve is connected at step 1344, the display is turned off at step 1346 and a microprocessor halt is issued at step 1348 causing the program to terminate. This should indicate to the user that a serious malfunction exists within the unit and professional repair assistance should be secured. However, if the valve is connected at step 1344, program flow returns to the main operating loop at step 1350.

Another test formed by the program during valve switching is the battery test which is accomplished at step 1320. If the battery is not within acceptable preset limits at step 1320, program flow passes to FIG. 9C point 9C-2. In this case, the microprocessor has determined that the battery is too low for proper operation, and that its operation should be halted until a new battery is installed. However, problematic results could occur if the device were halted during the time when the valve were open, as water would continually flow during this entire period. Therefore, when the battery low indication is detected, at step 1352 the program tests to determine if the valve is closed. If valve is not closed, at step 1354 an 8 seconds since motor turn on test is performed. If 8 seconds have elapsed, the motor is turned off and any disastrous results cannot be rectified due to insufficient battery capacity. However, this branch of the flow chart is for a contingency only, and should never be used in actual operation. If 8 seconds have not elapsed as step 1354, program flow returns to step 1352 where the valve closed is again tested for.

If the valve is closed at set 1352, a program delay is injected at step 1354 and the valve closed condition is again tested at step 1356. This provides a software debounce circuit to insure that the valve is actually closed. If the valve is still closed at step 1356, the motor is turned off at step 1358. The display is then turned off at step 1346 and a microprocessor halt is issued at step 1348.

However, what happens if when the valve on or valve off routine is executed while the portable programming unit is not docked with the water control unit 12? In this case, the valve off flag has been set at step 1312 or the valve on flag has been set at step 1302. However, since the valve has never been opened or closed, these flags have never been reset (at step 1338). Therefore, when the main loop of the program is executed, each time around at step 1054 a valve pending flag will be detected as being set and the outcome will be positive. Therefore, the valve pending routine will be called at step 1056.

The valve pending routine begins at step 1360 with the condition of water control unit 12 being docked with portable programming unit 14 being tested for at step 1362. If the two are still not docked, program flow returns to the point of call at step 1364. Thus, as long as the portable programming unit is not docked with the water control unit 12, valve pending will be called but only the single step 1362 of the routine will be executed.

However, if when valve pending is called the test of step 1362 indicates a positive outcome —that is the portable programming unit 14 and the water control unit 12 are docked, a software delay is initiated at step 1364. If after this 1.7 second delay at step 1364 the valve is not connected at step 1366, program flow again returns to the point of call at step 1365. If the valve is still connected at step 1366 however, program flow is transferred to step 1368 where the presence of the valve on flag is tested for. If the valve on flag is set, program flow goes to the right where a valve open routine beginning with step 1307 is executed. If the valve on flag is not set, program flow goes to the left where a valve closed routine is executed beginning with step 1318.

Thus, this novel program feature allows any function to be properly initiated even when the portable programming unit is remote from the water control unit. The valve can be turned on or off or any programming operations can be initiated. When the water control unit is again docked with the portable programming unit, any outstanding commands will be executed at that time. Thus, full separability, yet unimpeded functionality, is assured by this novel software.

The key scan routine will now be described with reference to FIG. 10A. The key scan routine scans the keys on the keyboard to determine whether the key has been pressed, which indicates a command by the user to the microprocessor. Flow begins at point 1400. The program tests for any key being pressed at step 1402 and if no key has been depressed returns to the point of call at step 1404. However, if a key has been pressed at step 1402, the key press flag is set at step 1406 and the key which has been depressed is stored in a special register. Then, control again returns to the point of origination at step 1408. Thus, this subroutine allows any key pressed on the keyboard to both set a flag, and to be stored in a special register.

FIG. 10B shows diagrammatically the advance time subroutine. The program flow begins at point 1410. At step 1412 the program tests to determine if the pointer is pointing to minutes. If it is, the minutes are incremented. If the incremented number of minutes is not equal to 60 at step 1416, control returns to the point of origination at step 1418. If the pointer is not pointing to minutes at steo 1412, the program tests if it is pointing to hours at step 1420. If so, the number of hours is incremented. Also, if the number of minutes is equal to 60 at step 1416, minutes are set equal to zero at step 1422 and the number of hours is also incremented at step 1424. After this number of hours is incremented, the hours being equal to thirteen is tested for at step 1426 (if the device is in time of day mode). If hours is equal to thirteen, the number of hours is set equal to one and the day pass flag is set if the time is a.m. at step 1428. If hours is not equal to thirteen, or after the day pass flag is set, control again returns to the point of origination at step 1430. If the device is not pointing to hours at step 1420, at step 1432, a test is made to determine whether a start time is equal to -:--. If so, the time is set to 12:00 at step 1434 and control again returns to the point of call at step 1436.

The divider interrupt will now be described with reference to FIG. 11. Every half second, a divider interrupt is caused, which causes microcontroller 200 to exit its normal processing path and execute the divider interrupt steps. Program flow begins at step 1500. At step 1502 normal interrupt housekeeping is accomplished, such as accumulator and register values being saved. At step 1504, the interrupt routine tests to determine if the motor on flag is set. If so, the motor counter is incremented at step 1506. This motor counter was described above with reference to the valve on and off routines in FIG. 9. As discussed supra, when this motor counter reaches eight seconds, the program will assume that a problem exists in the valve. This counter is tested at step 1508 to see if it has reached eight seconds. If it has, the motor eight second flag is set at step 1510. If not, program flow loops around step 1510.

At step 1512, the interrupt routine increments the time counter by a half a second. Thus, every time the divider interrupt routine is executed (every half second) a half second is added to the time counter. At step 1514, a test is executed to see if the time counter has reached 60 seconds. If the time counter has reached 60 seconds, at step 1516 the time counter is reset, and the minute flag is set. Then, when executing the main loop, at step 1040, the minute flag will be detected as being set causing the program flow to shift to FIG. 8H.

If the time counter is not equal to 60 seconds or after the minute flag has been set in step 1516, the key press flag is tested for at ste.p 1518. If set, the key timer is incremented at step 1520. If the key press flag is not set at step 1518, or after the key timer is incremented at step 1520, program flow returns to its normal operation in the loop at step 1522.

Referring now more particularly to FIG. 12, there is shown therein an extension cord accessory, generally indicated at 360, which is adapted to be interconnected between the units 12 and 14 of the apparatus 10 so as to render the programming unit 14 capable of not only being programmed while in a remote position with respect to the water control unit 12 fixed to the sill cock but also of operating the unit 12 from a remote position, as well. As previously discussed, the FIG. 12 drawing depicts the display showing the valve or "run" screen. The extension cord accessory 360 includes a 3-lead plug assembly, generally indicated at 362, adapted to connect electrically with the water control unit 12 in the same fashion as the 3-lead plug assembly 120, a length of 3 lead wire 364 extending from the plug assembly 362 and a plug unit 366 connected with the other end of the wire 364 and adapted to connect electrically and mechanically with the programming unit 14 in the same fashion as the water control unit 12.

As shown, the 3-lead plug assembly 362 is mounted within a tubular housing member 368. The plug assembly is mounted within the forward end of the tubular member 368 and the wire 364 extends outwardly of the rear end thereof. A resilient protective sheath 370 extends around the member 368. The rear end of the sheath 370 peripherally seals with the wire, as indicated at 372. The forward end of the sheath is formed into a flared resilient suction cup element 374 similar to the element 124 previously described. The plug assembly 362 connects electrically with socket assembly 116 in a manner similar to the plug assembly 120 with the element 374 providing a mechanical and electrical seal therebetween.

The plug unit 366 consists essentially of two housing half parts 382 and 384 suitably fixed together to provide a structure which is substantially identical to structure of the housing assembly 16 disposed outwardly from the large diameter peripheral wall portions 18 thereof. The main body of each housing half part is semi-cylndrical in configuration; being closed at one end with a semicircular end wall 386. End walls 386 are formed with a central access opening 388 which leads to a socket assembly 390 carried by the end walls 386. Socket assembly 390 is substantially identical to socket assembly 116 previously described.

Formed on the other end of the housing half part 382 is a flat mounting flange 392 which serves to mount the plug unit 366 in stable relation on any flat surface. Mounting flange 392 is suitably apertured to receive fasteners 394 which serve to secure the plug unit 366, for example, on a vertical wall surface.

Housing half parts 382 and 384 also provide end walls 396 at the mounting flange ends thereof which provide an annular abutment surface 398. An exterior annular frustoconical surface 400 is formed inwardly of the annular abutment surface 398 and an exterior annular groove 402 is formed inwardly of the annular surface 400. Annular groove 402 receives an O-ring 404 similar to the O-ring 132 previously described and performs identical functions with respect to the frustoconical surface 129 and interior cylindrical surface 136 of the portable programming unit 14. It can thus be seen that the programming unit 14 is capable of being removed and docked with respect to the plug unit 366 in precisely the same manner as it is with fixed water control unit 12.

Referring now more particularly to FIG. 13, there is shown therein a whole lawn above-ground watering system, generally indicated at 410. This system could be used in conjunction with the microcontroller as configured for the plural lawn sprinkling system option. The system 410 preferably includes apparatus, generally indicated at 10A, which is similar to the apparatus 10 previously described. The apparatus 10A iuncludes a sill cock mounted water control unit 12 and a cooperating portable programming unit 14A which is substantially similar to the programming unit 14 previously described.

As discussed above, the microcontroller of the present invention is particularly desirable in the system 410 which also includes a portable stepping valve unit 450. In accordance with the principles of the present invention the portable stepping valve unit 450 includes a housing assembly, generally indicated at 452. As shown the housing assembly 452 is supported on a U-shaped lawn engaging runner 454. It will be understood that other known lawn supporting means such as wheels, spikes or the like may be utilized, if desired. Housing assembly 452 includes a female hose coupler 456 constituting an inlet. In the system 410 shown, a length of hose 458 is connected between the male hose coupler 34 of the sill cock mounted unit 12 and the female hose coupler 456 of the stepping valve unit 450.

The housing assembly 452 also includes three male hose couplers 460, 462, and 464. It will be understood that two or more outlets in the form of male hose couplers can be provided. In the system 410 shown in FIG. 13, three outlets are shown, since this number corresponds to the number of watering cycles per day which can be programmed into the programming unit 14A. In the system 410 shown, the three outlets 460, 462, and 464 are connected with three separate lengths of hose 472, 474, and 476 respectively.

By use of the multiple outlets, different areas of a desired irrigation area can be serially watered allowing a larger area to be watered than was previously possible with a predetermined amount of water pressure. Thus, more effective use can be made of each sill cock, as any desired number of hoses can be attached to the multiple outlets connected to each sill cock, each individual hose being serially filled with water on a time shared basis so that different areas of the irrigation area are watered at different times.

Mounted within the housing assembly 452 is a mechanism 478 adapted to operate during each cycle of movement of the valve 42 consisting of a first movement from its opened position into its closed position and a second movement from its closed position into its opened position for communicating the inlet female hose coupler 456 with a successive one of each of the three outlet male hose couplers 460, 462 and 464 during the time of the cycle when the valve 42 is in its opened position. This mechanism 478 may take various known forms. An exemplary form is disclosed in U.S. Pat. No. 4,316,480, the dislcosure of which is hereby incorporated by reference into the present specification. The patent also references several other patents, namely; U.S. Pat. Nos. 3,369,565; 3,785,391; 3,924,652; 4,034,775; and 4,125,124; and the disclosure of these patents are likewise incorporated by reference into the present specification.

As best shown in FIG. 14, the housing assembly 452 includes an inlet section 480, an intermediate section 482, and an outlet section 484. The intermediate section 482 comprises a first chamber 486 and a second chamber 488 which is cylindrical and open at one end, the first and second chamber being connected by a cylindrical opening 490 which is coaxial with the cylindrical chamber 488. The inlet section 480 has coupler 456 at one end and an opening 492 at the other end connecting it to the first chamber 486 of the intermediate section 482.

The outlet section 484 is connected to the bottom of the intermediate section 482 at the open end of cylindrical second chamber 488 by a quick connect-disconnect mechanism 494. Male hose couplers 460, 462, and 464 are in the outlet section 484. An anti-siphon mechanism 496 is located on the intermediate section 482 which permits air to be drawn into chamber 488 whenever a suction occurs therein.

A distributing valving member 498 is coaxially mounted in chamber 488. Valving member 498 includes at least one port 500 which may be selectively indexed to come into register with one of the three outlet ports leading to the outlet male hose couplers 460, 462, and 464. In FIG. 14, one outlet port 502 is shown which leads to outlet male hose coupler 460.

The valving member 498 is connected by a rod 594 to a piston valve arrangement 506.

The piston valve arrangement 506 comprises a circular flange 508 which is coaxially mounted with cylindrical opening 490 and is arranged to overlap a flat annular surface 510 located around the cylindrical opening 490 on the side which engages cylindrical chamber 488. The circular flange 508 has an annular valve sealing member 512 positioned around its outer surface for engaging the flat annular surface 510 when the piston arrangement 506 is biased upwardly.

The piston arrangement 506 includes a rod extension 514 which extends upwardly above the flange 508 and in line with rod 504. This rod has longitudinally spaced cam followers 516 and 518 which engage cam mechanisms 520 mounted around the inner surface of an indexing cylinder 522. Cylinder 522 extends, through an opening in the top of intermediate section 482 and is fixed to the top of the housing by an integral flange 524 and bolts 526.

The cam followers 516 and 518 are longitudinally spaced along and circumferentially offset on rod 514 so that as rod 514 and hence cam followers 516 and 518 commence their downward stroke from their FIG. 14 position, cam follower 516 will contact a cooperating upper face of a cam mechanism 520 causing cam follower 516 to rotate as it translates or reciprocates, therefore also causing rod 504 and valving member 498 to rotate. This action places the port 500 in alignment with one of the outlet ports of the outlet section 484 so that water can flow through port 500 and its aligned outlet port. As the cam followers 516 and 518 will then engage a cooperating lower face of a cam mechanism 520 causing cam follower 518 to rotate as it translates or reciprocates, upwardly therefore also causing rod 504 and valving member 498 to rotate so that the port 500 will be rotated towards its next outlet port to be engaged when the mechanism is again moved downwardly. Other camming arrangements can be used, and one is shown in U.S. Pat. Nos. 3,460,560; 3,524,470; and 3,924,652, to obtain step-by-step sequencing with reciprocation.

The piston arrangement 506 has its piston basically formed as a cylinder 528 which extends upwardly from the circular flange 508, between the outer surface of the indexing cylinder 522 and the inner surface of the cylindrical opening 480 into the first chamber 486. It is to be noted that the opening 490 could be extended in length with a valve seat therein such as shown in U.S. Pat. No. 4,125,124 with the circular flange 508 fitting within the extended opening 490 and having an annular sealing member for engaging the valve seat.

The lower end of rod 504 is connected to distributing valve member 498 through a slide connecting joint 530 wherein limited axial sliding movement is permitted by the rod 504 and distributing valve member 498 and relative rotation between rod 504 and valving member 498 is prevented. The slide connecting joint 530 includes a sleeve member fixed in the valving member 498 which includes an upper sleeve 532 and a larger lower sleeve 534. A flange member 536 projects outwardly from the lower end of the rod 504 to have slidable movement within the larger sleeve 534, and the rod 504 is keyed in the sleever 532. It can be seen that the flange member 536 limits the downward movement of distributing valving member 498 with relation to the rod 504 since it will engage the annular abutment formed by the upper and lower sleeves 532 and 534. This connection also provides a positive unseating force for valve member 438 when the rod is moved upwardly. The connecting means between the rod 504 and the distributing valve member 498 is the same as shown in U.S. Pat. No. 4,125,124, referred to above.

The piston arrangement 506, rod extension 514, rod 504, and valving member 498 are biased to their position shown in FIG. 14 by a biasing mechanism 538. This mechanism comprises a rod 540 having a piston 542 fixed to the lower end thereof. The rod 540 is placed in a mating bore 544 located up the center of rod 504. The mating bore 544 is shown extending to approximately the location of the flange 508. A ball 546 is located between the end of the rod 540 and the bottom of the mating bore 544. Piston 542 is located in a bore 548 in the outlet section 480 at the center of the outlet ports. A seal ring 550 is positioned around the outer circumference of piston 542 for engaging the side of the bore 548 to prevent any leakage of fluid thereby. A spring 552 is positioned between the bottom of the bore 548 and the facing bottom of the piston 542. An opening 554 opens the bottom of the bore to atmosphere so that a fluid will not become trapped therein and prevent the free movement of piston 542 when it is operating in this mode.

It can be seen that as water under pressure enters inlet coupler 456 and passes from inlet section 488 to the first chamber 486 of the intermediate section 482, the water will act on the piston valve arrangement 506 moving it downwardly when the force can overcome the force provided by the spring 552. At that point, the cam follower 516 moves downwardly to engage the cooperating face of cam 520 and the port 500 is aligned with the next outlet port and the water is permitted to flow past the upper end of the cylinder 528. It is noted that the length of the cylinder 528 is made so that as the valve member 498 has its lower surface engage the outlet ports, the upper end of the cylinder 528 will be positioned to permit water flow through the cylindrical opening 450 into the chamber 488 where it can flow out the port 500. When the water under pressure is turned off at valve 42, the force provided by the spring 532 will act on the piston valve 42, the force provided by the spring 532 will act on the piston valve arrangement 506 to move it upwardly and place the sealing member 512 against the annular surface 510 closing the opening 490. At the same time, the cam follower 518 moves upwardly to engage the cooperating face of cam 520 and the port 500 is rotated towards the next outlet port to be engaged when the mechanism is again moved downwardly when valve 42 is opened and water under sufficient pressure enters inlet coupler 456.

It can thus be seen that once the unit 14A has been properly programmed to receive three separate watering cycles, the stepping valve unit 450 will operate to cause each one of the three watering cycles, to be performed by one of the three sprinklers 466, 468, and 470. Moreover, these three separate sprinkling cycles will be repeated on every set day.

While the system 410 shown in FIG. 13 is preferred, it is within the contemplation of the present invention to eliminate the runner 454 from the unit 450 and connect the female inlet hose coupler 456 of the unit 450 directly on the male outlet hose coupler 34 of the water control unit 12. In this case, both of the units 12 and 450 are effectively mounted together in supported relation on the sill cock 62. Stated differently, the housings of both units when so interconnected effectively become a single housing structure providing a single female inlet hose coupler 58 and a plurality of male outlet hose couplers 460, 462 and 464, with the female coupler 58 serving to connect the entire single housing structure in supported relation on the sill cock 62.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modification encompassed within the spirit and scope of the following claims.

What is claimed is:

1. Apparatus for connection with a sill cock for communicating water under pressure from the sill cock with a hose having a lawn sprinkler communicating therewith comprising a female coupler for connection with the sill cock, a male coupler for connection with the hose, valve means beneath said couplers movable into opened and closed positions with respect thereto so as to permit and prevent respectively communication of the water under pressure from the sill cock when said female coupler is connected therewith with the hose when said male coupler is connected therewith, battery means for providing a source of electrical current, battery operated vale moving means operable in response to the connection of the electric current from said battery means therewith for effecting movement of said valve means from its closed position into its opened position, battery operated programming means for (1) selecting a sprinkler time period in the future when it is desired to water with the sprinkler and (2) selecting an immediate single valve menas movement either from its position into its closed position or from its closed position into its opened position when it is desired respectively either to communicate the hose with water under pressure or to shut off the hose from communication with the water under pressure, battery operated display means for displaying the sprinkler time period selected by said programming means, a water control unit containing said male coupler, said valve menas, said battery operated valve moving means and said female coupler so as to render said water control unit operable to be fixed to the sill cock in supported relation thereby when said female coupler is connected therewith, a manually portable programming unit containing said battery operated programming means, said battery operated display means, and said battery means operatively connected with said battery operated programming means and said battery operated display means, mounting means operatively associated with both of said units for interengagement to mount said portable programming unit in supported relation on said water control unit in an operative position and for disengagement to enable the portable programming unit to be disposed in a remote position with respect to said water control unit such that a user can operate said programming means remote from said water control unit allowing for observation of said display means at close eye-level proximity, and means operable (1) when a sprinkler time period has been selected on said programming means and said portable programming unit is mounted in supported relation on said water control unit in said operative position for connecting an electrical current from said battery means with said battery operated valve moving means when the sprinkler time period selected on said programming means arrives so as to cause said valve means to be moved into its opened position and water under pressure from the sill cock connected with said female coupler to flow into the hose connected with said male coupler during the selected sprinkler time period, (2) in response to the mounting of said portable programming unit in supported relation on said water control unit in said operating position when a single valve means movement has been selected on said programming means with said portable programming unit disengaged from said water control unit for connecting an electrical current from said battery means with said battery operated valve means so as to cause said valve means to be moved through the single movement selected and (3) when a single valve means movement is selected on said programming means with said portable programming unit supported on said water control unit in said operating position for connecting an electrical current from said battery means with said battery operated valve mean so as to caues said valve means to be moved through the single movement selected.

2. Apparatus as defined in claim 1 wherein said means accomplishing said function (2) performs the following routine:

determining if the present time of day corresponds to a time of day which has been programmed on the programming means to command a valve means movement at such programmed time of day;

determining if an intermediate single valve means movement has been commanded;

effecting a valve means movement when such an immediate single valve means movement is indicated in one of said determining steps when the portable programming unit is mounted in supported relation on said water control unit in said operative position;

when one of said determining steps indicates that an immediate single valve means movement should be effected, but the portable programming unit is not mounted in supported relation on said water control unit in said operative position, performing a routine comprising the steps of:

(a) setting a valve pending indication to indicate that an immediate single valve means movement has been commanded but not effected;

(b) checking again, after a predetermined time period, to determine if the portable programming unit is mounted in supported relation on said water control unit in said operative position;

(c) repeating said checking again step until the the portable programming unit is mounted in supported relation on said water control unit in said operative position; and (d) when said checking again step indicates that the portable programming unit is mounted in supported relation on said water control unit in said operative position, effecting the pending immediate single valve means movement and clearing the valve pending indication set in said setting step.

3. Apparatus as defined in claim 1 wherein said valve means comprises a ball valve mounted between said couplers for rotational movement in one direction and operable during successive 90° movements to move successively into one of said opened and closed positions, said valve moving means comprises a battery operated electric motor and a speed reduction assembly drivingly connected between said motor and said ball valve.

4. Apparatus as defined in claim 3 wherein said current connecting means includes a motor turn-off switch operable in response to said ball valve reaching each successive one of said opened and closed positions.

5. Apparatus as defined in claim 4 wherein cam means is operatively connected to move with said ball valve for operating said motor turn-off switch.

6. Apparatus as defined in claim 3 wherein said current connecting means includes an electrical plug assembly carried by one of said units and a cooperating electrical socket assembly carried by the other of said units, said plug assembly being engagable and disengagable with said socket assembly.

7. Apparatus as defined in claim 3 wherein said speed reduction assembly includes a series of axially aligned interconnected planetary gear sets.

8. Apparatus as defined in claim 1 wherein said current connecting means is also for:

(3) detecting a mounting of said portable programming unit in supported relation on said water control unit in said operating position; and (4) producing an indication of a pending operation when a valve means movement is selected on said programming means while said portable programming unit and said water control unit are disengaged from one another.

9. Apparatus as defined in claim 8 wherein said current connecting means is also for: (5) effecting said pending operation of said valve means when a mounting of said portable programming unit on said water control unit in said operative position is detected by said means for detecting a mounting.

10. Apparatus as defined in claim 9 wherein a debounce delay is executed before the effecting of said pending operation is initiated.

11. A device as defined in claim 1 wherein said current connecting means is also for (3) automatically terminating the movement of said valve moving means when said valve moving means has been connected to the electric current from said battery means for a time period longer than a predetermined period of time, thereby preventing possible damage to said valve moving means.

12. A device as defined in claim 1 further comprising battery testing means for detecting a current level of said battery means and for disabling the operation of said current connecting means when insufficient current is stored in said battery means to safely allow a movement of said valve means, thereby insuring that said valve means is never left in said opened position with insufficient current in said battery means to effect a movement of said valve means into said closed position.

13. Apparatus as defined in claim 1 wherein said display means further includes means for displaying time of day and day of the week.

14. Apparatus as defined in claim 1 wherein said programming means includes means for selecting a mode of programming from a plurality of user alterable programming modes, said selected mode being indicated on said display means.

15. Apparatus as defined in claim 14 wherein said programming means further includes means for altering a value of a parameter of the mode selected by said mode selecting means.

16. A device as defined in claim 15 wherein said programming means further includes manual on means for selecting a single movement of said valve means from the closed position to the opened position.

17. Apparatus as defined in claim 16 wherein said programming means further includes separate manual off means for selecting a single movement of said valve means from the opened position to the closed position.

18. A device as defined in claim 17 wherein said manual on means and said manual off means are also used for altering a value of a parameter of at least one of said modes selected by said mode selecting means.

19. Apparatus as defined in claim 1 wherein said battery operated programming means includes means for selecting a plurality of sprinkler time periods in the future.

20. Apparatus as defined in claim 19 wherein said means for selecting a plurality of sprinkler time periods in the future includes means for selecting a separate run time for each of the plurality of time periods selected, each said run time indicating the length of time that said valve means will be in an opened position when the associated sprinkler time period selected begins.

21. A device as defined in claim 20 wherein said battery operated programming means includes means for selecting specific predetermined days of the week within which said plurality of sprinkler time periods occur.

22. A device as defined in claim 21 wherein the possible modes of predetermined days of the week include: (1) any days of the week being singly selectable as on or off, (2) every second day selected, and (3) every third day selected.

23. A device as defined in claim 14 wherein said modes include (1) time of day set, (2) a day of the week set, (3) selected days of the week in the future set, (4) a plurality of start times in the future set, and (5) a plurality of run times in the future set.

* * * * *

UNITED STATES PATENT AND TRADEMARK OFFICE
CERTIFICATE OF CORRECTION

PATENT NO. : 4,722,478

DATED : February 2, 1988

INVENTOR(S) : Douglas C. Fletcher et al.

It is certified that error appears in the above-identified patent and that said Letters Patent is hereby corrected as shown below:

```
Column 28, line 49, "vale"  should read -- valve --.
Column 28, line 57, "menas" should read -- means --.
Column 28, line 68, "menas" should read -- means --.
Column 29, line 50, "caues" should read -- cause
Column 29, line 49, "mean"  should read -- means --.
```

Signed and Sealed this

Sixteenth Day of August, 1988

Attest:

DONALD J. QUIGG

Attesting Officer

Commissioner of Patents and Trademarks